US012643569B2

(12) United States Patent
Srivastav

(10) Patent No.: US 12,643,569 B2
(45) Date of Patent: *Jun. 2, 2026

(54) VEHICLE SYSTEM LIDAR FOG DETECTION AND COMPENSATION

(71) Applicant: Zoox, Inc., Foster City, CA (US)

(72) Inventor: Arvind Srivastav, San Francisco, CA (US)

(73) Assignee: Zoox, Inc., Foster City, CA (US)

( * ) Notice: Subject to any disclaimer, the term of this patent is extended or adjusted under 35 U.S.C. 154(b) by 52 days.

This patent is subject to a terminal disclaimer.

(21) Appl. No.: 18/896,342

(22) Filed: Sep. 25, 2024

(65) Prior Publication Data

US 2025/0010885 A1 Jan. 9, 2025

Related U.S. Application Data

(63) Continuation of application No. 17/845,865, filed on Jun. 21, 2022, now Pat. No. 12,162,515.

(51) Int. Cl.
B60W 60/00 (2020.01)
G01S 7/497 (2006.01)
(Continued)

(52) U.S. Cl.
CPC .... B60W 60/0011 (2020.02); B60W 60/0015 (2020.02); G01S 7/497 (2013.01); G01S 13/931 (2013.01); G01S 17/89 (2013.01); G01S 17/931 (2020.01); B60W 2420/408 (2024.01); B60W 2554/20 (2020.02); B60W 2554/40 (2020.02);
(Continued)

(58) Field of Classification Search
CPC ......... B60W 60/0011; B60W 60/0015; B60W 2420/408; B60W 2554/20; B60W 2554/40; B60W 2555/20; B60W 2556/25; B60W 30/09; B60W 30/0956; B60W 2554/60; B60W 2556/35; G01S 7/497; G01S 13/931; G01S 17/89; G01S 17/931; G01S 7/4808; G01S 13/72; G01S 13/865; G01S 17/50; G01S 7/417; G01S 2013/93271

See application file for complete search history.

(56) References Cited

U.S. PATENT DOCUMENTS 9,855,894 B1 * 1/2018 Khorasani ............... G06T 11/10
10,754,037 B2 8/2020 England et al.
(Continued)

OTHER PUBLICATIONS

Office Action for U.S. Appl. No. 17/845,865, dated Apr. 30, 2024, 55 pages.

*Primary Examiner* — Fadey S. Jabr
*Assistant Examiner* — Faris Asim Shaikh
(74) *Attorney, Agent, or Firm* — Lee & Hayes, P.C.

(57) ABSTRACT

Techniques for detecting and determining a density for a non-impeding object based on correlation between radar and lidar returns are described herein. The techniques provide for receiving lidar data and radar data from a vehicle system operating in an environment. Portions of the lidar data and radar data are determined based on being associated with moving objects in the environment. The portions are then correlated to determine a similarity between the radar and lidar data. The similarity may then be used to determine an indication and density of the non-impeding object in the environment and cause the vehicle to operate within the environment accordingly.

20 Claims, 6 Drawing Sheets

600 ⟶

(51) Int. Cl.
  *G01S 13/931* (2020.01)
  *G01S 17/89* (2020.01)
  *G01S 17/931* (2020.01)

(52) U.S. Cl.
  CPC ..... *B60W 2555/20* (2020.02); *B60W 2556/25* (2020.02)

(56) References Cited

U.S. PATENT DOCUMENTS

| | | | | |
|---|---|---|---|---|
| 11,594,017 | B1 | 2/2023 | Gupta et al. | |
| 2010/0066587 | A1* | 3/2010 | Yamauchi | G05D 1/0274 |
| | | | | 342/54 |
| 2014/0324266 | A1* | 10/2014 | Zhu | G01S 13/865 |
| | | | | 382/104 |
| 2016/0266256 | A1* | 9/2016 | Allen | G01C 23/00 |
| 2017/0031015 | A1 | 2/2017 | Mei et al. | |
| 2017/0248693 | A1 | 8/2017 | Kim | |
| 2017/0307735 | A1* | 10/2017 | Rohani | G01S 13/89 |
| 2018/0232947 | A1* | 8/2018 | Nehmadi | G01S 7/295 |
| 2019/0051063 | A1* | 2/2019 | Tatourian | G07C 5/02 |
| 2019/0294167 | A1* | 9/2019 | Kutila | G08G 1/096827 |
| 2020/0174131 | A1* | 6/2020 | Chen | G01S 17/931 |
| 2020/0217952 | A1* | 7/2020 | Rider | G01S 13/58 |
| 2020/0301013 | A1 | 9/2020 | Banerjee et al. | |
| 2020/0309923 | A1* | 10/2020 | Bhaskaran | G01S 7/4802 |
| 2020/0309957 | A1* | 10/2020 | Bhaskaran | G01S 17/86 |
| 2020/0379096 | A1 | 12/2020 | Zhou et al. | |
| 2021/0019537 | A1 | 1/2021 | Hiroi | |
| 2021/0094538 | A1* | 4/2021 | Beller | B60W 40/04 |
| 2021/0183088 | A1 | 6/2021 | Gallo et al. | |
| 2021/0278523 | A1 | 9/2021 | Urtasun et al. | |
| 2022/0083841 | A1* | 3/2022 | Isele | G01S 17/89 |
| 2022/0101635 | A1* | 3/2022 | Koivisto | G01S 7/417 |
| 2022/0120903 | A1* | 4/2022 | Krause Perin | G01S 17/34 |
| 2022/0178718 | A1* | 6/2022 | Xia | B60W 60/00256 |
| 2022/0327719 | A1* | 10/2022 | Shaag | G01C 21/3848 |
| 2023/0168359 | A1 | 6/2023 | Rezvani et al. | |
| 2023/0184931 | A1* | 6/2023 | Wang | G01S 13/89 |
| | | | | 342/52 |
| 2023/0214728 | A1* | 7/2023 | Danilyuk | G06V 20/56 |
| | | | | 706/12 |
| 2023/0227027 | A1 | 7/2023 | Sung et al. | |
| 2023/0228884 | A1* | 7/2023 | Won | B60W 10/18 |
| | | | | 701/301 |
| 2023/0244242 | A1* | 8/2023 | Armstrong-Crews | |
| | | | | G01S 17/58 |
| | | | | 701/25 |
| 2023/0258805 | A1 | 8/2023 | Won | |
| 2024/0385315 | A1* | 11/2024 | Lunn | G01S 17/931 |

* cited by examiner

THRESHOLD
DISTANCE
304

302

300

404

STEAM 406

LIDAR
DETECTIONS/
RADAR
DETECTIONS
412

NON-IMPEDING
OBJECT LIDAR
DETECTIONS 410

MANHOLE COVER 408

402

400

600

RECEIVE RADAR DATA <u>602</u>

RECEIVE LIDAR DATA <u>604</u>

DETERMINE A FIRST PORTION OF RADAR DATA INCLUDING A MOVING OBJECT
<u>606</u>

DETERMINE A SECOND PORTION OF LIDAR DATA INCLUDING A MOVING OBJECT
<u>608</u>

FIRST PORTION SIMILAR TO SECOND PORTION
<u>610</u>

YES

NO

DETERMINE AN INDICATION OF A NON-IMPEDING OBJECT
<u>612</u>

CONTROL A VEHICLE SYSTEM BASED ON THE INDICATION
<u>614</u>

VEHICLE SYSTEM LIDAR FOG DETECTION AND COMPENSATION

RELATED APPLICATIONS

This application claims priority to and is a continuation of U.S. patent application Ser. No. 17/845,865, filed on Jun. 21, 2022, the entire contents of which are incorporated herein by reference.

BACKGROUND

Light detection and ranging or "lidar" refers to a technique for measuring distances to visible surfaces by emitting light and measuring properties of the reflections of the light. A lidar system has a light emitter and a light sensor. The light emitter may comprise a laser that directs light into an environment. When the emitted light is incident on a surface, a portion of the light is reflected and received by the light sensor, which converts light density to a corresponding electrical signal. A distance is then calculated based on the flight time and the known speed of light.

However, fine particulate matter may also reflect light. Problematically, fog, smoke, fog, exhaust, steam, and other such vapors may reflect light emitted by a lidar system. The lidar system may accordingly produce an indication of the existence of a surface at the location of the vapor, even though no solid exists at the location.

Radar generally measures the distance from a radar device to the surface of an object by transmitting a radio wave and receiving a reflection of the radio wave from the surface of the object, which may be read by a sensor of the radar device. The sensor may generate a signal based at least in part on radio waves incident on the sensor. This signal may include a return signal attributable to the reflection, but the signal may also include portions attributable to noise and/or other interfering signals (whether from the radar device itself or from an external source).

BRIEF DESCRIPTION OF THE DRAWINGS

The detailed description is described with reference to the accompanying figures. The use of the same reference numbers in different figures indicates similar or identical components or features.

DETAILED DESCRIPTION

Figure 1:
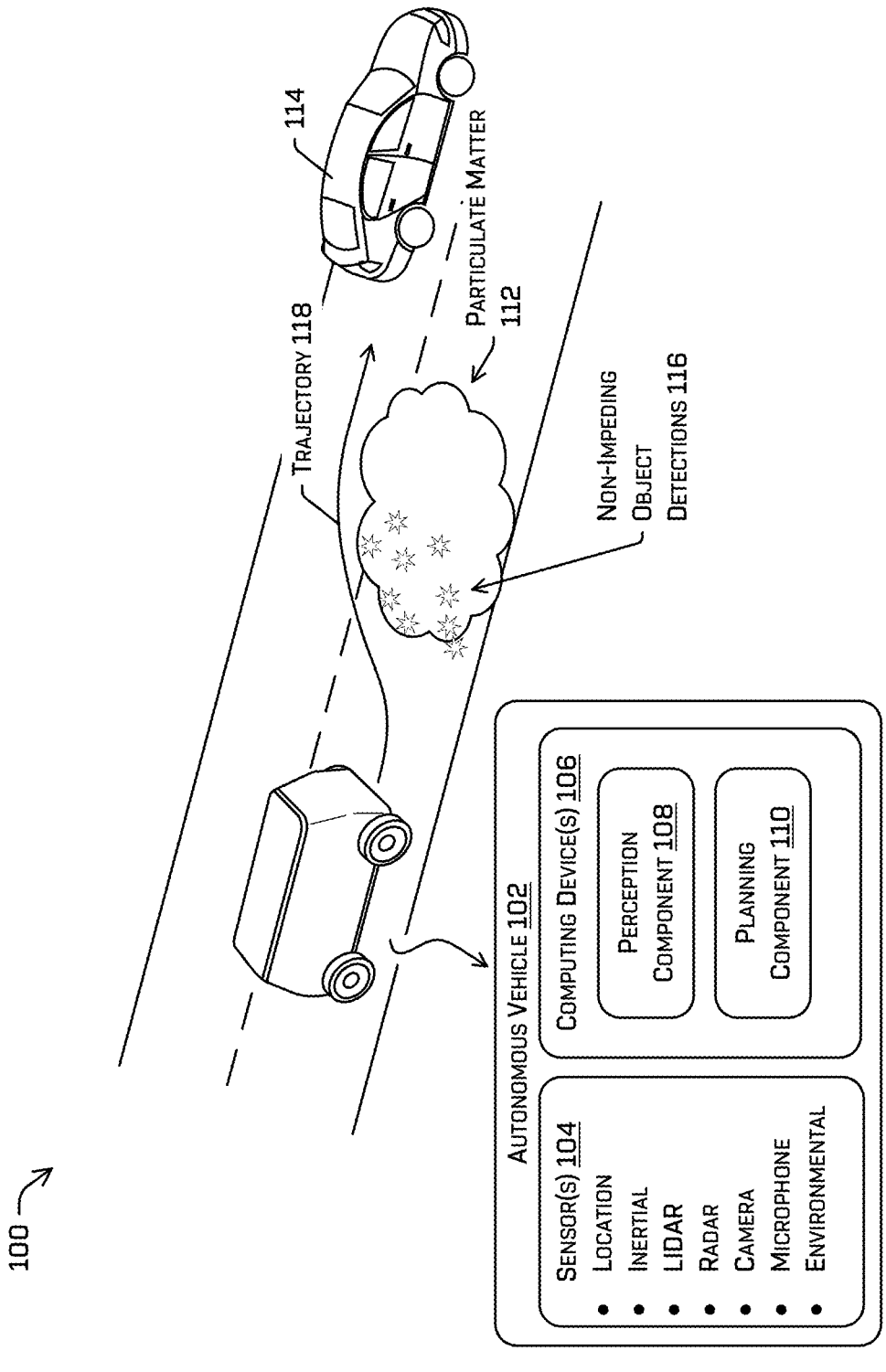
FIG. 1 illustrates an example scenario depicting a vehicle coming upon a non-impeding object and the potential effect caused by non-impeding object detections, according to at least one example.

Techniques described herein are directed to detection of non-impeding objects using radar and lidar returns from a sensor array, such as an array of an autonomous vehicle. Though examples described herein may relate directly to vehicle systems and autonomous vehicles, other systems and environments may use the systems and techniques described herein for detection of non-impeding objects. Non-impeding objects include particulate matter, such as fog, dust, dirt, steam, smoke, snow, and other such collections of particulate matter. Such non-impeding objects present challenges for autonomous vehicles as they degrade detection of objects beyond the particulate matter using image data and lidar data, which may be relied upon for autonomous driving purposes. Image sensors may be obstructed by the presence of the particulate matter and lidar systems may emit beams that reflect from varying depths within the non-impeding object, such as from different depths of fog, and therefore produce unreliable or untrustworthy (e.g., having a low confidence score) lidar data in the presence of such particulate matter. Particulate matter may cause returns in lidar data locally indicative of a surface though no solid surface is present (i.e., in a specific region observed by the lidar sensor) and/or totally (i.e., in an entire or near-total region observed by a lidar sensor). For example, local interference caused by particulate matter may include exhaust from a tailpipe of a vehicle, steam from a manhole cover, smoke from an engine, etc., whereas global interference may comprise fog, non-local smoke (e.g., smoke from a forest fire), non-local smog, rain, etc.

The systems and methods described herein use radar and lidar systems to determine non-impeding objects, determine density of the non-impeding objects, and use the radar and lidar data to navigate the autonomous vehicle through an environment in a reliable and safe manner. Though described herein with respect to lidar, the systems and techniques described herein may be used for confirmation and/or detection of non-impeding objects and non-impeding object density determinations for other sensor data, such as from cameras, long wave infrared cameras (LWIR), infrared cameras, and other such detection systems. In particular, sensor systems that operate in near visual electromagnetic spectrum rang (e.g., operating between $10^{-8}$ and $10^{-3}$ meters) may be impacted by non-impeding objects whereas radar emissions of greater wavelength may not be substantially attenuated. The techniques for determining non-impeding object density and detecting such non-impeding objects, may be based on the use of both radar and lidar sensors. Radar systems may be unaffected by such particulate non-impeding objects and can therefore be used in conjunction with the lidar systems to determine non-impeding objects. Lidar, in absence of non-impeding objects, can be used to determine moving targets, and a point cloud of such targets can be obtained by subtracting consecutive scans, e.g., by subtracting matching lidar points over consecutive scans. Radar can be used to determine moving targets using a Doppler measurement determined by the radar system and point clouds of such targets can be determined from radar observations. In some examples, other types of radar may also be used to detect moving objects and be used for correlation with the lidar or other such data. For example, millimeter wave radar may be used in some examples. In the absence of non-impeding objects, a strong correlation can exist between lidar and radar observations of moving targets. In some examples, the correlation may also be used between static targets, for example while a vehicle equipped with a sensor array is moving through an environment including static objects that may appear to have motion relative to the vehicle. However, as a density of non-impeding objects increases, the number of non-impeding object detections by the lidar system increases (which may result in a reduced effective range of a lidar system). Meanwhile, the radar observations may remain unaffected by the non-impeding object.

The techniques described herein include determining a presence and density of a non-impeding object based on a correlation between lidar and radar observations from moving targets in the environment around the autonomous vehicle. A greater correlation, e.g., more matching detection points between the radar data and the lidar data, may be indicative of an absence or low density of a non-impeding object while a low degree of matching detections, e.g., a low correlation, may be indicative of the presence of a non-impeding object and a density of the non-impeding object based on the level of correlation. The correlation may be based at least in part on a similarity score that may be determined based on the radar and lidar observations of moving objects, with a higher similarity score indicative of a lower density of the non-impeding object and/or a lower probability of a non-impeding object existing in the environment. The similarity score may be determined based on comparisons between the point clouds from lidar data and point clouds or other indicia from radar data. In some examples, the correlation may be determined using a machine learning approach trained using lidar and radar observations tagged with non-impeding object density scores that makes inferences on non-impeding object density and presence based on current lidar and radar observations. In some examples, a machine learned model can be trained using ground truth data consisting of a radar return data, lidar return data, and an expected effective range of the lidar system. This ground truth data may be for an entire scene or per object. In some examples, the machine learned can instead output a confidence value for sensing a specific object using lidar and radar data. The output of such a model may be aggregated over several objects in a scene to determine a uniform or non-uniform effective range of a lidar or similar system.

In some examples, the density of the non-impeding object may be identified in addition to a type of non-impeding object. The non-impeding object may include fog, smoke, sand, dust, dirt, and other such particulate clouds. The different types of particulate clouds may be identifiable based on the impact to the lidar data or based on inputs from other sensors such as temperature and humidity sensors that may be used to identify conditions that may lead to a foggy environment or dusty environment. In some examples, the different types of non-impeding objects may cause the vehicle system to behave differently, for example with different traction control and steering adjustments for foggy versus dusty environments where the vehicle system may behave differently due to the different conditions.

Detecting the density of the non-impeding object may include determining a similarity between outputs of the lidar and radar sensors. For example, the techniques may comprise determining a first depth measurement associated with a lidar sensor that corresponds or has a similarity to a second depth measurement associated with a radar sensor. A perception component may compare the first depth measurement and the second depth measurement and determine whether a distance between a first point associated with the first depth measurement and a second point associated with the second depth measurement is less than a threshold distance. If the distance meets or exceeds the threshold distance, the perception component may suppress the first depth measurement as being associated with a non-impeding object based on a lack of similarity to a radar return. The similarity determination between the lidar and radar returns may be performed using many different techniques, including a similarity of the lidar and radar returns based on a cross-correlation, for example to correlate the lidar return when it is within a threshold distance, e.g., within a predetermined percentage of the distance of a radar return. Additionally, or alternatively, the correlation between the lidar and radar data may be determined as a similarity score that is calculated using a similarity function and/or machine learning algorithm trained as described herein. In some examples, the similarity score may be based on a cosine similarity of the returns from the radar and lidar returns. The cosine similarity may correspond to a dot product of a vector from the radar return with a vector from the lidar return divided by a product of the magnitude of the vectors. In some examples, the vectors of each of the radar and lidar returns may indicate the location of the sensor array to the location of the return. The similarity score may additionally or alternatively be based on a Jaccard index that indicates detections from the lidar data within a threshold distance of detections in the radar data and determines lidar returns that do not correspond to the radar returns. The similarity score may additionally or alternatively be determined based on a Johnson-Lindenstrauss transform that reduces the dimensionality of the radar and lidar data while preserving distances between the data points of the returns, the distances between the data points may then be used to determine similarity between the radar and lidar data. The similarity score may additionally or alternatively be determined based on a normalized Euclidean distance between the radar returns and the lidar returns. In some examples, the similarity score may be determined using a combination of the techniques discussed herein. For example, the techniques discussed above may be used as input data to a machine-learned model to determine a similarity score between the lidar and radar returns and/or to determine a presence or density of a non-impeding object based on the similarity between the radar and lidar returns. Other techniques may be used to determine the similarity score between the radar and lidar returns. In examples, the similarity score may be calculated over successive ranges from an originating vehicle to determine an effective range of a lidar or similar system. For example, a similarity score divergence meeting a threshold can be used to determine an effective range of the lidar system. This may be determined uniformly (e.g., aggregated) around the vehicle or non-uniformly. In some examples, the effective range of different modalities can be determined individually such that different modalities (e.g., vision, lidar, thermal) may be configured to each operate at a different respective effective range. In some examples, the similarity score may be used to additionally determine a confidence score associated with the lidar returns. The confidence score may be used by a vehicle system, for example while planning a route through an environment.

The confidence score of the lidar returns, and the similarity score may also be used to determine a density of the non-impeding object. A low similarity score of the lidar returns to the radar returns is indicative of a high density for the non-impeding objects. An index may be determined based on the similarity score, the index for example from zero to one hundred, with the index indicative of a density of the non-impeding object. For example, a similarity score may be in a range of zero to one with scores closer to one being associated with a higher degree of similarity between the radar and lidar data. The similarity score may then be associated with an index, for example from one to one hundred, with zero being indicative of an absence of a non-impeding object and a threshold score being indicative of a non-impeding object in the environment. The index may also be indicative of a density of a non-impeding object, for example with an index of one hundred associated with a high density non-impeding object. The similarity score may be mapped to the index in a predetermined manner, for example with a linear mapping by multiplying the similarity score by one hundred to produce the index value. Index values may therefore be associated with densities, according to various measurements such as parts per million. In some examples, different indexes may be used for different types of non-impeding objects, e.g., a separate index for fog, snow, and dust. The different indexes may be selected based on sensor data from other sensors such as temperature and/or humidity data. In some examples, density such as by particle size and particle frequency (e.g., ppm) may also be used for density scores, among other such measurements. A machine learning technique may be used to determine particular density scores based on the similarity between the lidar and radar returns. In such an example, the machine learning model may be trained using data labeled with density scores.

Determining non-impeding objects during navigation through an environment may benefit vehicle systems, including autonomous vehicle systems. Non-impeding lidar observations may be reduced or identified as such using these techniques, thereby enabling a vehicle to navigate environments that otherwise prove difficult for typical autonomous vehicles. Additionally, vehicle systems equipped with radar and lidar systems may prioritize or weight the lidar observations and/or radar observations based on a presence or determined density of a non-impeding object in the environment. This may result in further increasing the environments and conditions in which a vehicle is able to navigate. For example, in foggy conditions, the lidar sensor of an autonomous vehicle may be particularly susceptible to detect non-impeding objects as solid surfaces beyond a threshold distance, where the threshold distance is determined based on the density of the fog. In such conditions, the autonomous vehicle system may weight the radar data to a greater degree than the lidar data beyond the threshold distance, or may entirely disregard lidar data beyond the threshold distance. In some examples, the autonomous vehicle may output the indication of the non-impeding object and/or the density of the non-impeding object to a planning component from a perception component that includes the radar and lidar sensors. The planning component may determine a route through an environment and rely on the radar and sensor data for detecting the environment through the perception component. In planning the route, the planning component may have to reconcile differing information, such as radar and lidar returns that are inconsistent with each other. Accordingly, the radar data and lidar data may each have a weight associated therewith, the weight associated with the extent that the radar and/or lidar data is used for determining the environment and planning the route through the environment. In some examples, the weight may be associated with an additional confidence score associated with the radar and lidar sensors. The planning component may increase a weight of the radar and decrease the weight associated with the lidar data in the event of a detected non-impeding object and/or a density over a threshold density of non-impeding object. In some examples, the planning component may decrease a weight associated with the lidar data over a threshold distance away from the vehicle, as such detections are more likely to be impacted by the non-impeding object.

FIG. 1 illustrates an example scenario 100 in which non-impeding object lidar detections may deleteriously affect the operation of a machine that relies on the accuracy of lidar detections, such as an autonomous vehicle 102. In some instances, the autonomous vehicle 102 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the autonomous vehicle 102 may be a fully or partially autonomous vehicle having any other level or classification. Moreover, in some instances, the guidance isolation techniques described herein may be usable by non-autonomous vehicles as well. It is contemplated that the techniques discussed herein may apply to more than robotic control, such as for autonomous vehicles. For example, the techniques discussed herein may be applied to mapping, manufacturing, augmented reality, etc.

According to the techniques discussed herein, the autonomous vehicle 102 may receive sensor data from sensor(s) 104 of the autonomous vehicle 102. For example, the sensor data may include a location signal (e.g., a GPS signal), an inertia signal (e.g., an accelerometer signal, a gyroscope signal, etc.), a magnetometer signal, a wheel encoder signal, a speedometer signal, a point cloud of accumulated lidar and/or RADAR points, an image (or images), an audio signal, and/or bariatric or other environmental signals, etc.

In some examples, the autonomous vehicle 102 may include computing device(s) 106 that may include a perception component 108 and/or a planning component 110. The perception component 108 may include one or more machine-learned (ML) models and/or other computer-executable instructions for detecting, identifying, segmenting, classifying, and/or tracking objects based at least in part on sensor data collected from the environment of the autonomous vehicle 102. In some instances, the perception component 108 may receive sensor data from sensor(s) 104 of the autonomous vehicle 102, determine perception data from the sensor data, and transmit the perception data to a planning component 110 for use by the planning component 110 to localize a position of the autonomous vehicle 102 on a global map and/or a local map, determine one or more trajectories, and/or control motion of the autonomous vehicle 102 to traverse a path or route, though any such operation may be performed in various other components (e.g., localization may be performed by a localization engine, not shown). In some instances, the perception data may be based at least in part on lidar data received from a lidar device and/or a radar device of the sensor(s) 104. The planning component 110 may determine instructions for controlling operations of the autonomous vehicle 102 based at least in part on perception data that is based on lidar data and/or radar data received from the lidar device and the radar device.

In particular, the planning component 110 may rely on one or more of the sensor(s) 104 to determine the existence and/or position(s) of object(s) in order to control operation of the autonomous vehicle safely and efficiently 102. Detections of a non-impeding object, for example as a surface detection by a lidar device due to a particulate matter 112, or other such non-impeding object, may degrade operation of a machine that relies on lidar data, like autonomous vehicle 102. For example, FIG. 1 illustrates an example two-dimensional representation of non-impeding object detections 116 (e.g., lidar data indicative of a solid surface due to the non-impeding object reflections) attributable to particulate matter 112 that autonomous vehicle 102 is able to pass through without harm to the autonomous vehicle 102 or its occupants.

In some examples, a lidar detection may comprise an indication of a distance to a detected surface calculated based at least in part on a time of delay of arrival of a reflection of light emitted by an emitted of the lidar device, as discussed above. In some examples, a processor of the sensor(s) 104 and/or the perception component 108 may determine a position of the surface relative to an axis of the lidar device and/or the autonomous vehicle 102 based at least in part on a known position and/or orientation of the lidar device and/or the channel (e.g., altitude and/or azimuth). Similarly, a radar detection may comprise an indication of a distance to a detected surface calculated based at least in part on a time of delay of arrival of a reflection of energy emitted by an emitter of the sensor(s) 104.

Since the non-impeding object detections 116 identify a surface where none exists, the planning component 110 may alter a trajectory 118 of the autonomous vehicle 102 to avoid colliding with the surface detected at the non-impeding object detections 116 and/or may take other undesirable actions, such as stopping forward progress, transmitting a request for teleoperations assistance, etc. Operating in the same environment may be another vehicle 114 or other moving objects that are easily detected by the sensor(s) 104 in the absence of non-impeding objects. However, the particulate matter 112 may cause the autonomous vehicle 102 to detect a surface at the non-impeding object detections 116 and therefore the planning component 110 may attempt to navigate through the environment as a result of both the vehicle 114 and the particulate matter 112 though the autonomous vehicle 102 may pass directly through the particulate matter 112 unimpeded. Therefore, the systems and techniques described herein provide for the autonomous vehicle 102 to detect the particulate matter 112 and pass through without delay after detecting it as a non-impeding object.

Figure 2:
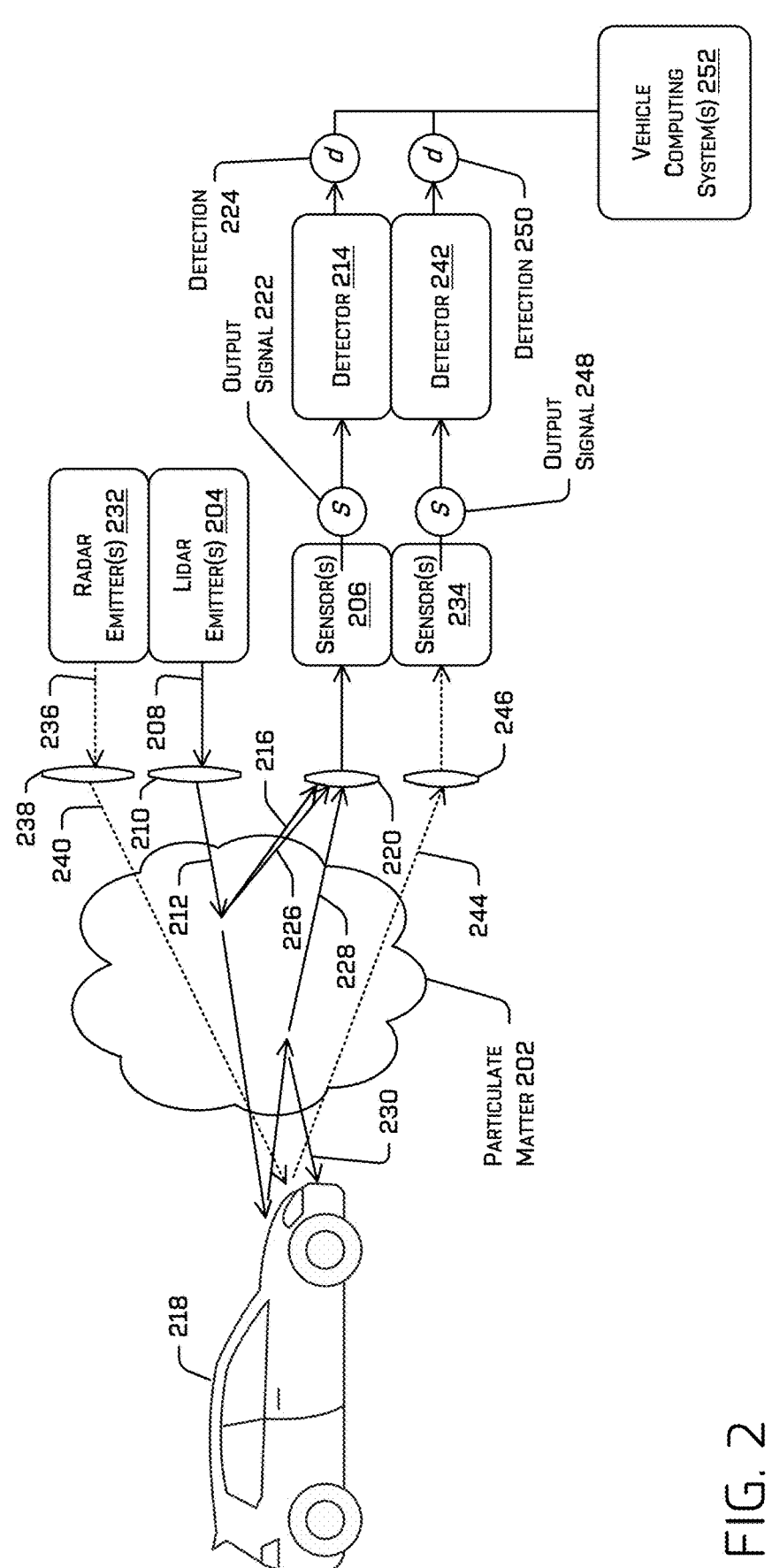
FIG. 2 illustrates a block diagram of components of an example sensor system to determine lidar detections from non-impeding objects, according to at least one example.

FIG. 2 illustrates a block diagram of components of an example sensor array 200 that includes a lidar and radar component to detect non-impeding objects, according to at least one example. The depicted example illustrates an example scenario in which a non-impeding object, such as particulate matter 112 of FIG. 1, may interfere with operation of a channel the lidar system.

The example sensor array 200 depicts a single channel of radar and lidar sensors, although the example sensor array 200 may comprise any number of channels. One skilled in the art would understand that the emitters and sensors may be multiplied in number beyond the single emitter and sensor depicted. For example, a first channel may measure a distance to any detectable surface in a first direction of an environment surrounding the example sensor array 200, whereas a second channel may measure a distance to any detectable surface in a second direction, where the first direction and the second direction are separated by three to five degrees, for example. The term "channel" may also encompass supporting circuitry that is associated with the emitter/sensor pair and at least some of the supporting circuitry may be shared among multiple channels (e.g., detector(s), digital-to-analog converter (DAC), analog-to-digital converter (ADC)). In some examples, adjacent channels of example sensor array 200 may be disposed within a housing of the example sensor array 200 to emit energy and/or receive energy along different azimuths and/or altitudes.

In some examples, lidar emitter 204 may include a laser emitter that produces light of a wavelength between 600 and 1000 nanometers. In additional or alternate examples, the wavelength of emitted light may range between 10 micrometers to 250 nm. The lidar emitter 204 may emit light (e.g., laser pulses) that varies in power and/or wavelength. For example, some of the laser emitters of the example sensor array 200 may emit light at a 905 nanometers, and others of the laser emitters may emit light at 1064 nanometers. The laser emitters of the different wavelengths can then be used alternately, so that the emitted light alternates between 905 nanometers and 1064 nanometers. The sensor 206 may be similarly configured to be sensitive to the respective wavelengths and to filter other wavelengths.

In some examples, radar emitter 232 may include one or more components to emit energy in a pattern and/or direction in a range of wavelengths and frequencies. The radar emitter 232 may emit energy at varying wavelengths and/or frequencies. The wavelengths of the radar emitter 232 are larger than the wavelengths of the lidar emitter 204, which produces lower resolution observation data from the radar, but also enables the radar emissions to pass through non-impeding objects that may obstruct or partially obstruct the lidar emissions.

For a single distance measurement via the depicted channel, lidar emitter 204 may be controlled to emit a burst of light pulses 208 (i.e., one or more) through a lens 210 as emitted pulse 212 and the corresponding sensor 206 may be powered on and/or otherwise allowed to pass a signal generated by the sensor 206 to detector 214. In some examples, the detector 214 may read a signal generated by the sensor 206 by opening a switch corresponding to the sensor 206. A sensor is considered "active," according to the discussion herein, when the signal output by a sensor is being read by the detector 214 and/or otherwise being relied on to determine whether or not the output signal indicates the existence of a surface.

For a single distance measurement, the radar emitter 232 may emit a burst of pulse 236 through a lens 238 as emitted pulse 240 and the corresponding sensor 234 may be powered on and/or otherwise allowed to pass a signal generated by the sensor 234 to the detector 242. In some examples, the detector 242 may read a signal generated by the sensor 234 by opening a switch corresponding to the sensor 234. A sensor is considered "active," according to the discussion herein, when the signal output by a sensor is being read by the detector 242 and/or otherwise being relied on to determine whether or not the output signal indicates the existence of a surface.

In the example scenario, the emitted pulse 212 may be partially or completely reflected by particulate matter 202 as reflection 216 (also referred to herein as reflected light). For example, particulate matter 202 may comprise water particles and/or droplets, dust particles, vehicle emissions, smoke particles, etc. In some examples, the particulate matter 202 may refract the emitted pulse 212, thereby causing the reflection 216 to comprise a split beam of light 226. The particulate matter 202 may also cause multiple reflections of respective portions of the emitted pulse 212. Collectively, these multiple reflections and/or refractions may cause the power of output signal 222 to be smeared over time. In some cases, part of the emitted pulse 212 may, in some cases and depending on the density and/or type of the particulate matter 202, pass through the particulate matter 202, and be reflected by a surface 218 behind the particulate matter 202 along an azimuth associated with the channel, which is depicted in FIG. 2 as reflection 228. In some examples, all or part of reflection 228 may pass through the particulate matter 202 on a return path and be received at sensor 206. FIG. 2 depicts possible reflections and/or refractions 230 of this reflection 228 that may be caused by particulate matter 202. The reflection 216 may pass through a lens 220 to sensor 206.

In some examples, the lens 210 and the lens 220 may be the same lens, depicted redundantly for clarity. In some examples, the lidar may include multiple laser emitters positioned within a chassis to project laser light outward through the one or more lenses. In some examples, the lidar may also include multiple light sensors so that light from any particular emitter is reflected through the one or more lenses to a corresponding light sensor. In other examples, the lens 220 may be a second lens designed so that beams from different emitters at different physical positions within a housing of the lidar are directed outwardly at different angles. Specifically, the lens 210 may be designed to direct light from the emitter of a particular channel (e.g., emitter 204) in a corresponding and unique direction. The lens 220 may be designed so that the corresponding sensor (e.g., sensor 206) of the channel receives reflected light from the same unique direction to disambiguate between light received through the lens 220 that is attributable to reflections of light emitted by other emitter(s).

In some examples, the sensor 206 may comprise a photomultiplier (e.g., silicon photomultiplier (SiPM)), photodiode (e.g., avalanche photodiode (APD), single-photon avalanche diode (SPAD)), and/or other device that converts light intensity at the sensor to a corresponding electrical signal (output signal 222). A portion of the output signal 222 generated by the sensor 206 may be attributable to the reflection 216. This portion of the output signal 222 may be termed a "return" and/or "return signal." Where the output signal 222 comprises a portion attributable to a reflection off the surface 218 and the particulate matter 202, the output signal would be said to comprise two returns (e.g., two portions of the output signal that have an amplitude and/or power that meet or exceed a detection threshold).

A return signal attributable to reflection off a surface 218 (without any interference from particulate matter 202) may generally be of the same shape as the light pulse 208 emitted by the emitter 204, although it may differ to some extent as a result of noise, interference, cross-talk between different emitter/sensor pairs, reflectivity of the surface 218 (e.g., whether the surface is L'Ambertian, retroreflective, etc.), an angle of the surface 218, interfering signals from other lidar devices, and so forth. The return signal will also be delayed with respect to the light pulse 208 by an amount corresponding to the round-trip propagation time of the emitted laser burst (i.e., the time delay of arrival). However, the return signal attributable to reflection of particulate matter 202 may not share the shape of light pulse 208.

In some examples, the detector 214 may read the output signal(s) generated by the sensor(s) of any currently active channels to determine whether any of the output signal(s) include a return signal (e.g., output signal 222 of sensor 206). For example, the detector 214 may determine whether an amplitude, energy, trigger event count (e.g., every instance an avalanche is triggered at a SPAD), and/or any other indication of a reception of a reflection of light emitted by an emitter of a channel, satisfies a detection threshold (e.g., meets or exceeds a detection threshold in amps, in Joules, arbitrary number (e.g., a number of counts, or units, as output from an ADC), etc.). For example, if the sensor 206 is active, the detector 214 may monitor the output signal 222 of the sensor 206 to determine whether an amplitude of the output signal 222 meets or exceeds the detection threshold. If a portion of the output signal 222 meets or exceeds the detection threshold, the detector 214 may indicate that portion as being a return signal and/or may output a detection 224. For example, the detector 214 may determine a time delay of arrival between emission of the light pulse 208 and receiving the reflected light pulse at the sensor 206 (i.e., as indicated by a relative time of the return signal) and/or a distance measurement corresponding to the time delay of arrival. In some examples, the detection 224 may comprise a distance measurement and/or a spatial position (e.g., a position within a depth map and/or voxel representation).

The detector 214 may be implemented in part by a field-programmable gate array ("FPGA"), an application-specific integrated circuit (ASIC), a microcontroller, a microprocessor, a digital signal processor ("DSP"), and/or a combination of one or more of these and/or other control and processing elements, and may have associated memory for storing associated programs and data.

In the example scenario, the emitted pulse 236 is not reflected by particulate matter 202 but proceeds to the surface 218 behind the particulate matter 202 along an azimuth associated with the channel, which is depicted in FIG. 2 as reflection 244. In some examples, all or part of reflection 244 may pass through the particulate matter 202 on a return path and be received at sensor 234. The reflection 244 may pass through a lens 246 to sensor 234.

In some examples, the lens 238 and the lens 246 may be the same lens, depicted redundantly for clarity. In some examples, the radar may include multiple emitters positioned within a chassis to project energy outward through the one or more lenses. In some examples, the radar may also include multiple sensors so that energy from any particular emitter is reflected through the one or more lenses to a corresponding sensor. In other examples, the lens 246 may be a second lens designed so that beams from different emitters at different physical positions within a housing of the radar are directed outwardly at different angles. Specifically, the lens 238 may be designed to direct energy from the emitter of a particular channel (e.g., emitter 232) in a corresponding and unique direction. The lens 246 may be designed so that the corresponding sensor (e.g., sensor 234) of the channel receives reflected light from the same unique direction to disambiguate between light received through the lens 246 that is attributable to reflections of light emitted by other emitter(s).

In some examples, the sensor 234 may comprise a device that converts received radar energy at the sensor to a corresponding electrical signal (output signal 248). The return signal attributable to reflection off a surface 218 (without any interference from particulate matter 202) may generally be of the same shape as the pulse 236 emitted by the emitter 232, although it may differ to some extent as a result of noise, interference, cross-talk between different emitter/sensor pairs, reflectivity of the surface 218 (e.g., whether the surface is L'Ambertian, retroreflective, etc.), an angle of the surface 218, interfering signals from other radar devices, and so forth. The return signal will also be delayed with respect to the pulse 236 by an amount corresponding to the round-trip propagation time of the emitted burst (i.e., the time delay of arrival).

In some examples, the detector 242 may read the output signal(s) generated by the sensor(s) of any currently active channels to determine whether any of the output signal(s)

include a return signal (e.g., output signal 248 of sensor 234). For example, the detector 242 may determine whether an amplitude, energy, trigger event count (e.g., every instance an avalanche is triggered at a SPAD), and/or any other indication of a reception of a reflection of energy emitted by an emitter of a channel, satisfies a detection threshold (e.g., meets or exceeds a detection threshold in amps, in Joules, arbitrary number (e.g., a number of counts, or units, as output from an ADC), etc.). For example, if the sensor 234 is active, the detector 242 may monitor the output signal 248 of the sensor 234 to determine whether an amplitude of the output signal 248 meets or exceeds the detection threshold. If a portion of the output signal 248 meets or exceeds the detection threshold, the detector 242 may indicate that portion as being a return signal and/or may output a detection 250. For example, the detector 242 may determine a time delay of arrival between emission of the pulse 236 and receiving the reflected pulse at the sensor 234 (i.e., as indicated by a relative time of the return signal) and/or a distance measurement corresponding to the time delay of arrival. In some examples, the detection 250 may comprise a distance measurement and/or a spatial position (e.g., a position within a depth map and/or voxel representation).

The detector 242 may be implemented in part by a field-programmable gate array ("FPGA"), an application-specific integrated circuit (ASIC), a microcontroller, a microprocessor, a digital signal processor ("DSP"), and/or a combination of one or more of these and/or other control and processing elements, and may have associated memory for storing associated programs and data.

Without implementing the techniques discussed herein, the detection 224 may include a detection of a non-impeding object that may be recognized as a surface (e.g., an indication of the existence and/or position of a surface in an environment surrounding the lidar system though the detection is due to a non-impeding object) if the detection 224 indicates a position of the particulate matter 202. The techniques discussed herein may comprise techniques for determining the particulate matter 202 as a non-impeding object. In at least some examples, the detection 224 and the detection 250 may be passed to the vehicle computing system 252 for determining a presence and/or density of a non-impeding object, such as the particulate matter 202. As such, a planning component (e.g., of the vehicle system) may discount, or otherwise account for, such detections.

The vehicle computing system 252 may determine a density, and thereby identifying non-impeding objects, such as the particulate matter 202 in an environment based on direct correlation between the lidar and radar detections, e.g., detection 224 and detection 250. The detections 224 and 250 will include observations from moving targets in the environment around the autonomous vehicle. The correlation may be determined based on a similarity score that may be computed based on the radar and lidar observations of moving objects, with a higher similarity score indicative of a lower density or probability of a non-impeding object being in the environment. The computation of the similarity score is discussed in further detail with respect to FIG. 5 below. In some examples, the correlation may be determined using a machine learning approach trained using lidar and radar observations tagged with non-impeding object density scores that makes inferences on non-impeding object density and presence based on current lidar and radar observations.

Detecting the density of the non-impeding object may include determining a correlation between outputs of the lidar and radar sensors. For example, the techniques may comprise determining a first depth measurement associated with a lidar sensor that corresponds to a second depth measurement associated with a radar sensor. A perception component may compare the first depth measurement and the second depth measurement and determine whether a distance between a first point associated with the first depth measurement and a second point associated with the second depth measurement is less than a threshold distance. If the distance meets or exceeds the threshold distance, the perception component may suppress the first depth measurement as being associated with a non-impeding object based on the lack of correlation with a radar return. The correlation may be performed using many different techniques, including a similarity of the lidar and radar returns based on a cross-correlation, for example to correlate the lidar return when it is within a threshold amount of a radar return in the region of detection.

For example, the correlation between the lidar and radar data may be determined as a similarity score that is calculated using a similarity function and/or machine learning algorithm trained as described herein. In some examples, the similarity score may be based on a cosine similarity of the returns from the radar and lidar returns. The cosine similarity may correspond to a dot product of a vector from the radar return with a vector from the lidar return divided by a product of the magnitude of the vectors. The vectors of each of the radar and lidar returns being from the location of the sensor array to the location of the return. The similarity score may additionally or alternatively be based on a Jaccard index that indicates detections from the lidar data within a threshold distance of detections in the radar data and determines lidar returns that do not correspond to the radar returns. The similarity score may additionally or alternatively be determined based on a Johnson-Lindenstrauss transform that reduces the dimensionality of the radar and lidar data while preserving distances between the data points of the returns, the distances between the data points may then be used to determine similarity between the radar and lidar data. The similarity score may additionally or alternatively be determined based on a normalized Euclidean distance between the radar returns and the lidar returns. In some examples, the similarity score may be determined using a combination of the techniques discussed herein.

For example, the techniques discussed above may be used as input data to a machine-learned model to determine a similarity score between the lidar and radar returns and/or to determine a presence or density of a non-impeding object based on the similarity between the radar and lidar returns. Other techniques may be used to determine the similarity score between the radar and lidar returns. In some examples, the similarity score may be used to additionally determine a confidence score associated with the lidar returns. The confidence score may be used by a vehicle system, for example while planning a route through an environment. In some examples, the similarity score may be based on an aggregation of radar data and lidar data over a period of time. The aggregation of the data over time may reduce errors from random returns unrelated to a non-impeding object such as interference from other signals or other reflections.

The reliability of the lidar returns, and the similarity score may also be used to determine a density of the non-impeding object. A low similarity score and low reliability or correlation of the lidar returns to the radar returns is indicative of a high density for the non-impeding objects. An index may be determined for the density for example from zero to one hundred that determines a density thereof. In some examples, density such as by particle size and particle frequency (e.g., ppm) may also be used for density scores, among other such measurements. A machine learning technique may be used to determine particular density scores based on the similarity between the lidar and radar returns, the machine learning model trained using data labeled with density scores.

Figures 3, 4:
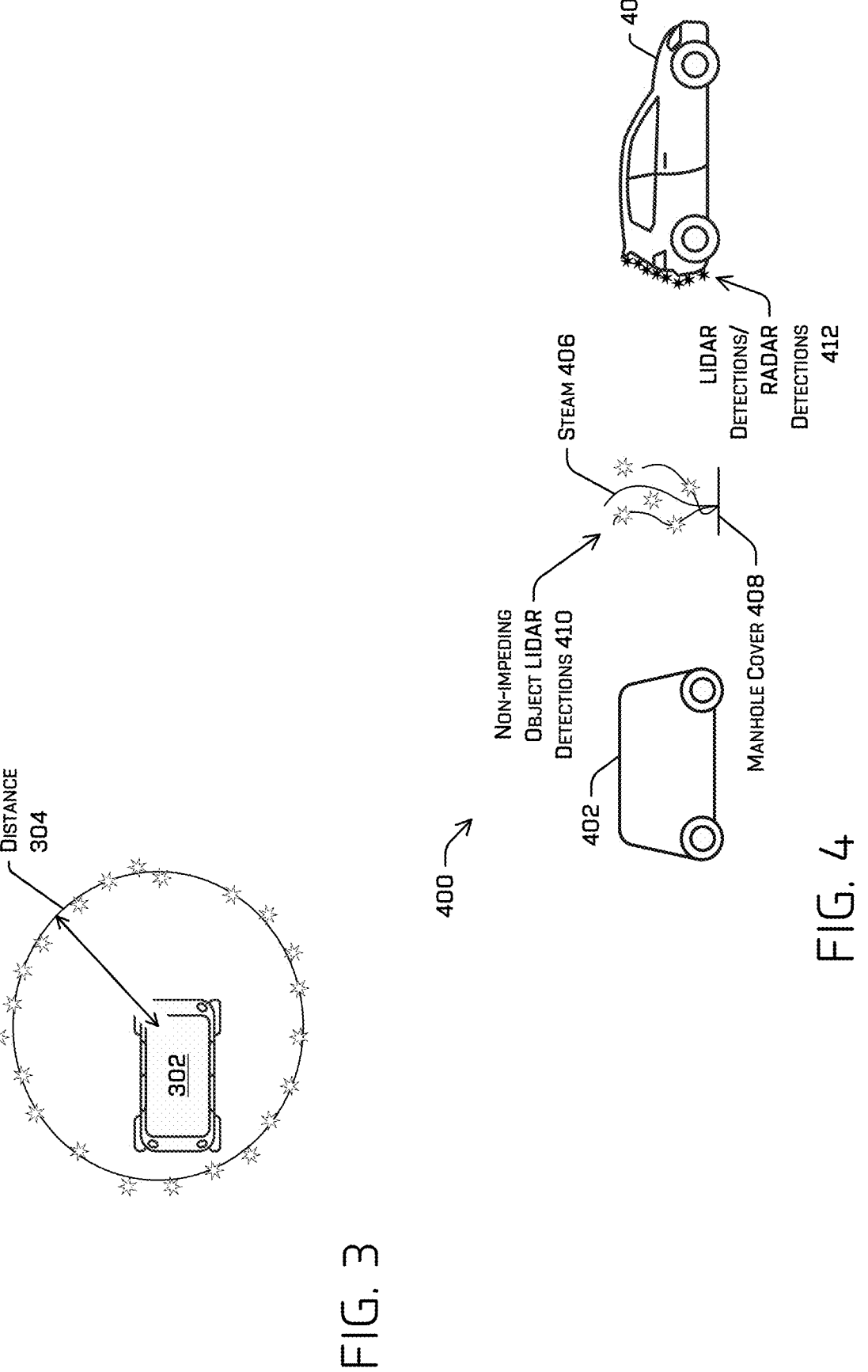
FIG. 3 illustrates an example vehicle system with a threshold distance associated with a confidence score for lidar detections, according to at least one example.
FIG. 4 illustrates an example technique for detecting non-impeding objects using lidar and radar sensor arrays, according to at least one example.

FIG. 3 illustrates an example vehicle system with a threshold distance associated with a confidence score for lidar detections, according to at least one example. FIG. 3 depicts an example scenario 300 in which an autonomous vehicle 302 is operating in an environment that includes total or near-total particulate matter permeation, as may be the case in fog or smoke from a distant forest fire. The perception component may determine an indication that one or more lidar detections are likely to be associated with non-impeding objects, especially beyond a threshold distance 304. Accordingly, after identifying a non-impeding object density, e.g., as discussed herein, the autonomous vehicle 302 may assign a reliability or confidence score to lidar detections at a distance greater than the threshold distance 304 and the confidence score at distances greater than the threshold distance 304 may be reduced to less than a confidence score for a detection at a distance less than the threshold distance 304.

In some examples, the threshold distance 304 may be dynamic and may represent a dynamic range for lidar sensing. For instance, at a particular density of non-impeding object, the threshold distance 304 may indicate a dynamic range at which the lidar sensor is within a percentage or threshold level of accuracy, when compared and correlated with the radar data. The threshold distance 304 may, therefore represent a range or distance at which the lidar data has or exceeds a particular confidence level. The confidence level may be based on the determined correlation and/or accuracy when correlated with the radar data. As the density of the non-impeding object increases, the threshold distance 304 may dynamically decrease to reduce a distance over which the lidar is relied upon by a perception and/or planning component of a vehicle. The confidence and/or trust associated with the lidar data may be decreased beyond the threshold distance 304. In some examples, the threshold distance 304 may represent the dynamic range at which the vehicle system uses the lidar data, or relies upon the lidar data to a greater extent than other data, such as radar data. In this manner, the threshold distance 304 may be used to dynamically adjust the weighting of the lidar data and other sensor data in navigating through an environment.

FIG. 4 illustrates an example technique for detecting non-impeding objects using lidar and radar sensor arrays, according to at least one example. FIG. 4 depicts an example scenario 400 in which a lidar sensor has generated a set of non-impeding lidar detections 410 associated with steam 406 rising from a manhole cover 408 and detections 412 associated with a vehicle 404. Note that steam 406 is an example of "local" particulate matter as an example of a non-impeding object since the detections are isolated to a sub-portion of the region observable by a lidar sensor. The sensor array of the autonomous vehicle 402 also includes a radar sensor that bypasses the steam 406 and generates detections 412 that overlap with the lidar detections. Accordingly, by correlating the lidar detections with the detections 412 from the radar, the vehicle 404 may be identified correctly through the steam 406.

The lidar and radar observations from the vehicle 404 are located spatially in the same regions and in the same clusters, e.g., having a similar range, yaw, and elevation from the autonomous vehicle 402. Accordingly, in the absence of non-impeding objects, a strong correlation exists between lidar and radar observations of moving targets. However, as a density of the steam 406 increases, the range of lidar detections for the vehicle 404 decreases and the number of potential surface detections as a result of non-impeding object interference increases. During the same increase, the radar observations of the vehicle 404 may remain unaffected by the non-impeding object.

According to the techniques described herein, the steam 406 may be identified based on direct correlation between lidar and radar observations from the vehicle 404. The correlation may be determined based on a similarity score that may be computed based on the radar and lidar observations of the vehicle 404 and may determine similarity in the clustering and location of the detections of the vehicle 404 relative to the autonomous vehicle 402, with a higher similarity score indicative of a lower density or probability of a non-impeding object being in the environment. In some examples, the correlation may be determined using a machine learning approach trained using lidar and radar observations tagged with non-impeding object density scores that makes inferences on non-impeding object density and presence based on current lidar and radar observations.

In some examples, the perception component of the autonomous vehicle 402 may determine a detection as being associated with a non-impeding object based at least in part on the radar data and lidar data lacking similarity in the portion or region of the non-impeding object lidar detections 410. In some examples, the techniques may comprise training an ML model to classify non-impeding objects according to their density. In some examples, such an ML model may receive lidar points and radar points as input (which may comprise a single scan and/or multiple scans) and may output an indication of the density of a non-impeding object located at a detection of the lidar system. Training the ML model may comprise tagging lidar and radar returns, taken simultaneously, with non-impeding object intensities corresponding to a density, e.g., parts per million and/or particle size. The ML model may then provide the indication to the planning system of the autonomous vehicle 402 for planning routes through the environment based on the presence of the non-impeding object. Accordingly, the autonomous vehicle 402 may determine and ignore and/or mask non-impeding objects for planning purposes. The autonomous vehicle may determine lidar returns with a particular confidence score that scales inversely with respect to the density of the non-impeding object. Accordingly, as the density increases, the planning system and/or perception system of the autonomous vehicle 402 may rely or weight the radar returns of the perception system more heavily than the lidar returns. Additionally, the autonomous vehicle 402 may implement a threshold as discussed with respect to FIG. 3 above.

Moreover, the perception component may additionally or alternatively use contextual data and/or other data such as vision data to identify non-impeding objects based on appearance, temperature, etc. Contextual data may comprise global map data (e.g., a location of a driving surface, a location of a pedestrian surface) and/or local data determined by the perception component from sensor data. For example, the local data may comprise a classification of a subset of sensor data and/or an identification of the sensor data as being associated with the classification. Tying this all together, this means that the perception component may increase a likelihood that a lidar point is associated with particular matter when contextual data indicates that the lidar point is located in the middle of a driving surface (a bush would be unlikely to be in the middle of a driving surface) and/or the contextual data indicates a portion of sensor data that attributable to vehicle exhaust.

Detecting the density of the non-impeding object may include determining a correlation between outputs of the lidar and radar sensors. For example, the techniques may comprise determining a first depth measurement associated with a lidar sensor that corresponds to a second depth measurement associated with a radar sensor. A perception component may compare the first depth measurement and the second depth measurement and determine whether a distance between a first point associated with the first depth measurement and a second point associated with the second depth measurement is less than a threshold distance. If the distance meets or exceeds the threshold distance, the perception component may suppress the first depth measurement as being associated with a non-impeding object based on the lack of correlation with a radar return. The correlation may be performed using many different techniques, including a similarity of the lidar and radar returns based on a cross-correlation, for example to correlate the lidar return when it is within a threshold amount of a radar return in the region of detection. The correlation between the lidar and radar data may be determined as a similarity score that is calculated using a similarity function and/or machine learning algorithm trained as described herein. In some examples, the similarity score may be based on a cosine similarity of the returns from the radar and lidar returns. The cosine similarity corresponds to a dot product of a vector from the radar return with a vector from the lidar return divided by a product of the magnitude of the vectors. The vectors of each being from the location of the sensor array to the location of the return. The similarity score may additionally or alternatively be based on a Jaccard index that indicates detections from the lidar data within a threshold distance of detections in the radar data and determines lidar returns that do not correspond to the radar returns. The similarity score may additionally or alternatively be determined based on a Johnson-Lindenstrauss transform that reduces the dimensionality of the radar and lidar data while preserving distances between the data points of the returns, the distances between the data points may then be used to determine similarity between the radar and lidar data. The similarity score may additionally or alternatively be determined based on a normalized Euclidean distance between the radar returns and the lidar returns. In some examples, the similarity score may be determined using a combination of the techniques discussed herein. For example, the techniques discussed above may be used as input data to a machine-learned model to determine a similarity score between the lidar and radar returns and/or to determine a presence or density of a non-impeding object based on the similarity between the radar and lidar returns. Other techniques may be used to determine the similarity score between the radar and lidar returns. In some examples, the similarity score may be used to additionally determine a confidence score associated with the lidar returns. The confidence score may be used by a vehicle system, for example while planning a route through an environment.

The reliability of the lidar returns, and the similarity score may also be used to determine a density of the non-impeding object. A low similarity score and low reliability or correlation of the lidar returns to the radar returns is indicative of a high density for the non-impeding objects. An index may be determined for the density for example from zero to one hundred that determines a density thereof. In some examples, density such as by particle size and particle frequency (e.g., ppm) may also be used for density scores, among other such measurements. A machine learning technique may be used to determine particular density scores based on the similarity between the lidar and radar returns, the machine learning model trained using data labeled with density scores.

In some examples, the non-impeding object lidar detections 410 may be localized, as in the instance of steam from a manhole cover 408. In some examples, the non-impeding object lidar detections 410 may indicate the non-impeding object covers a greater area, such as surrounding the entirety of the vehicle 402. Accordingly, the density of a non-impeding object may be determined over a range or area such that localized pockets of non-impeding objects and/or large regions obscured by non-impeding objects may be identified. The lack of correlation between lidar and radar data may be used to identify localized pockets where the non-impeding object exists, and may be used to generate a mapping of non-impeding object density in a region. In this manner, the mapping may be used to map sizes and densities of non-impeding objects in an environment. In some examples, the maps of non-impeding objects may be shared among vehicles such that updated maps of non-impeding objects may be used amongst a fleet of vehicles for the fleet of vehicles to anticipate and adapt to the presence of non-impeding objects in the environment. Such mapping may also be used to identify varying density of non-impeding objects by mapping the non-impeding objects and associating density scores with the non-impeding objects on the mapped region.

Figure 5:
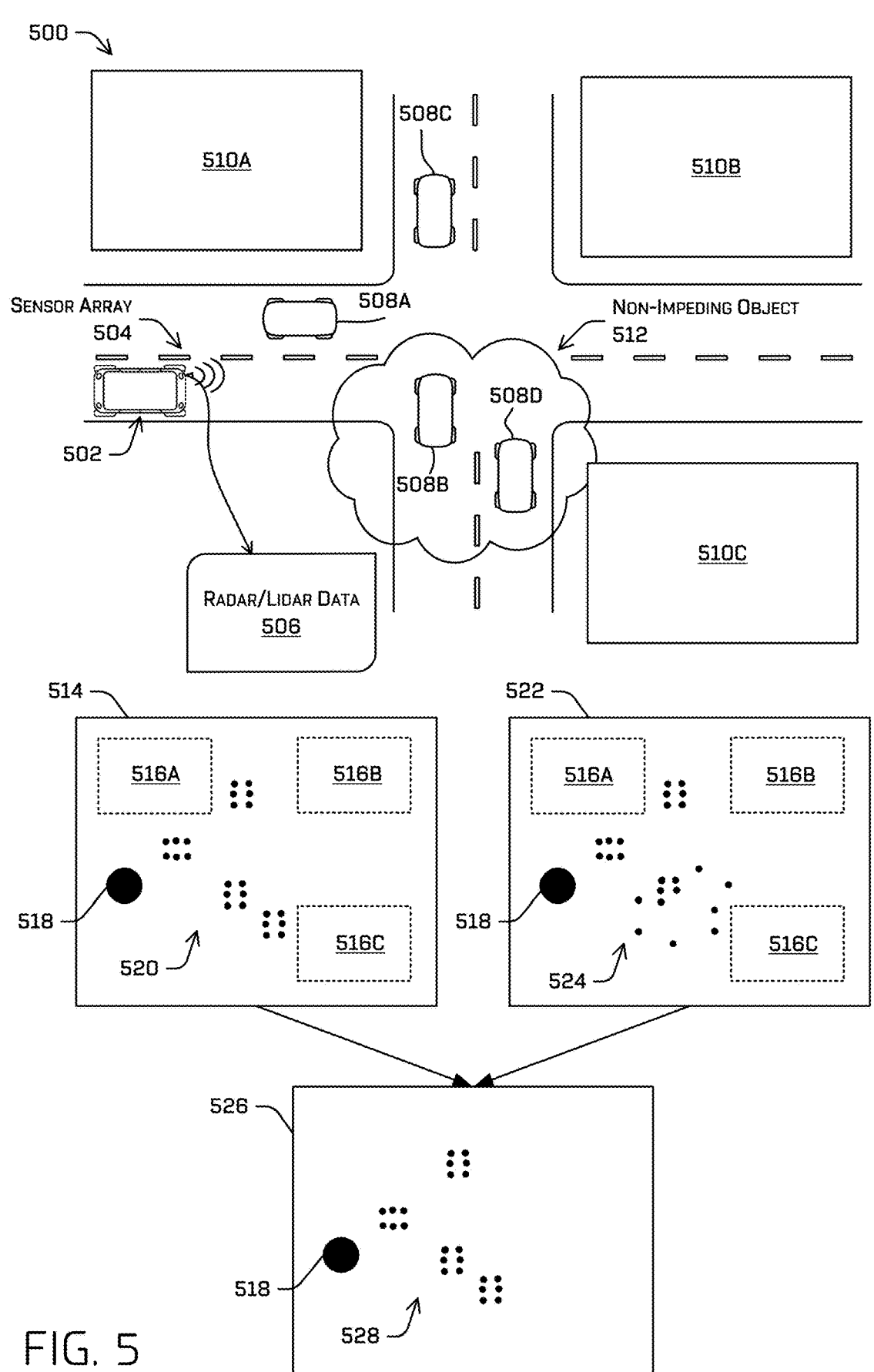
FIG. 5 illustrates an example technique for detecting non-impeding objects using lidar and radar sensor arrays, according to at least one example.

FIG. 5 illustrates an example technique for detecting non-impeding objects using lidar and radar sensor arrays, according to at least one example. In the example of FIG. 5, an autonomous vehicle 502 is operating within an environment 500 that includes roads and buildings 510A, 510B, and 510C (collectively buildings 510). The autonomous vehicle 502 is equipped with a sensor array 504 that includes a radar and lidar sensor, such as described above. The sensor array 504 captures radar and lidar data 506 that is used for navigating the autonomous vehicle 502 through the environment 500. Also operating within the environment are vehicles 508A, 508B, 508C, and 508D (collectively vehicles 508). The environment 500 also includes a non-impeding object 512 that may include smoke, fog, steam, dust, dirt, snow, and other such particulate matter in a cloud.

During operation, outside of the non-impeding object 512, the lidar data provides accurate and highly detailed returns that are used for navigating through the environment 500 based on identifying objects, especially moving objects within the environment 500. When encountering the non-impeding object 512, the lidar returns may become obstructed and less reliable. Accordingly, the techniques as described herein provide for determining the presence and density of the non-impeding object as well as adjusting the perception and/or planning systems of the autonomous vehicle 502 to navigate in the presence of the non-impeding object 512.

A representation of the radar data 514 includes the buildings 516A, 516B, 516C (collectively buildings 516) and the autonomous vehicle 518. The representation also indicates clusters of radar returns 520 associated with the vehicles 508. The clusters of radar returns 520 are associated with moving objects, and such moving objects may be isolated based on their having a velocity and/or through the use of consecutive radar returns, e.g., a sequence of radar return frames. Subtracting the consecutive radar returns results in the stationary objects, such as the buildings 516 being removed from consideration during correlation with the lidar data, and accordingly only the moving object returns are correlated between the radar data 514 and the lidar data 522.

The lidar data 522 similarly includes the buildings 516 and autonomous vehicle 518. The clusters of lidar returns 524 include lidar returns as a result of interactions between the lidar sensor and the non-impeding object 512. The clusters of lidar data 522 are associated with moving objects, and such moving objects may be isolated based on their having a velocity and/or through the use of consecutive lidar returns, e.g., a sequence of lidar return frames. Subtracting the consecutive lidar returns results in the stationary objects, such as the buildings 516 being removed from consideration during correlation with the radar data, and accordingly only the moving object returns are correlated between the radar data 514 and the lidar data 522.

Correlation between the radar returns 520 and the lidar returns 524 enables identification of the non-impeding object based on its interference with the lidar sensor. Furthermore, the density of the non-impeding object may be determined from the correlation between the returns. A representation of the correlation 526 illustrates that only the clusters 528 correlate between the radar returns 520 and the lidar returns 524.

Detecting the density of the non-impeding object may include determining a correlation between the radar returns 520 and the lidar returns 524. For example, the techniques may comprise determining a first depth measurement associated with a lidar return that corresponds to a second depth measurement associated with a radar return. A perception component may compare the first depth measurement and the second depth measurement and determine whether a distance between a first point associated with the first depth measurement and a second point associated with the second depth measurement is less than a threshold distance. If the distance meets or exceeds the threshold distance, the perception component may suppress the first depth measurement as being associated with a non-impeding object based on the lack of correlation with a radar return. The correlation may be performed using many different techniques, including a similarity of the lidar and radar returns based on a cross-correlation, for example to correlate the lidar return when it is within a threshold amount of a radar return in the region of detection. The correlation between the lidar and radar data may be determined as a similarity score that is calculated using a similarity function and/or machine learning algorithm trained as described herein. In some examples, the similarity score may be based on a cosine similarity of the returns from the radar and lidar returns. The similarity score may also be based on a Jaccard index and/or other techniques described herein that determine shared detections and determine lidar returns that do not correlate to radar returns. The similarity score may also be determined based on a normalized Euclidean distance between the radar and lidar data. Other techniques may be used to determine the similarity score between the radar and lidar returns, and accordingly, determine a reliability of the lidar returns.

The reliability of the lidar returns, and the similarity score may also be used to determine a density of the non-impeding object. A low similarity score and low reliability or correlation of the lidar returns to the radar returns is indicative of a high density for the non-impeding objects. An index may be determined for the density for example from zero to one hundred that determines a density thereof. In some examples, density such as by particle size and particle frequency (e.g., ppm) may also be used for density scores, among other such measurements. A machine learning technique may be used to determine particular density scores based on the similarity between the lidar and radar returns, the machine learning model trained using data labeled with density scores.

After determining the similarity score and/or the density of the non-impeding object as described above, the autonomous vehicle 502 may navigate through the environment 500 using the radar and lidar returns in a modified manner. For example, the lidar may be assigned a confidence score based on the density of the non-impeding object 512 and/or a distance of the lidar return, with higher density and greater distances associated with lower confidence scores. The confidence score may be used by a planning component of the autonomous vehicle 502 to weight and/or partially or totally ignore lidar returns in the presence of the non-impeding object 512. In some examples the lidar data may be weighted according to the confidence score, and receive a lower weighting when the confidence score associated with the lidar returns is low.

Figure 6:
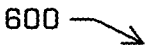
FIG. 6 illustrates an example flow diagram for non-impeding object detection, according to at least one example.
Figure 6:
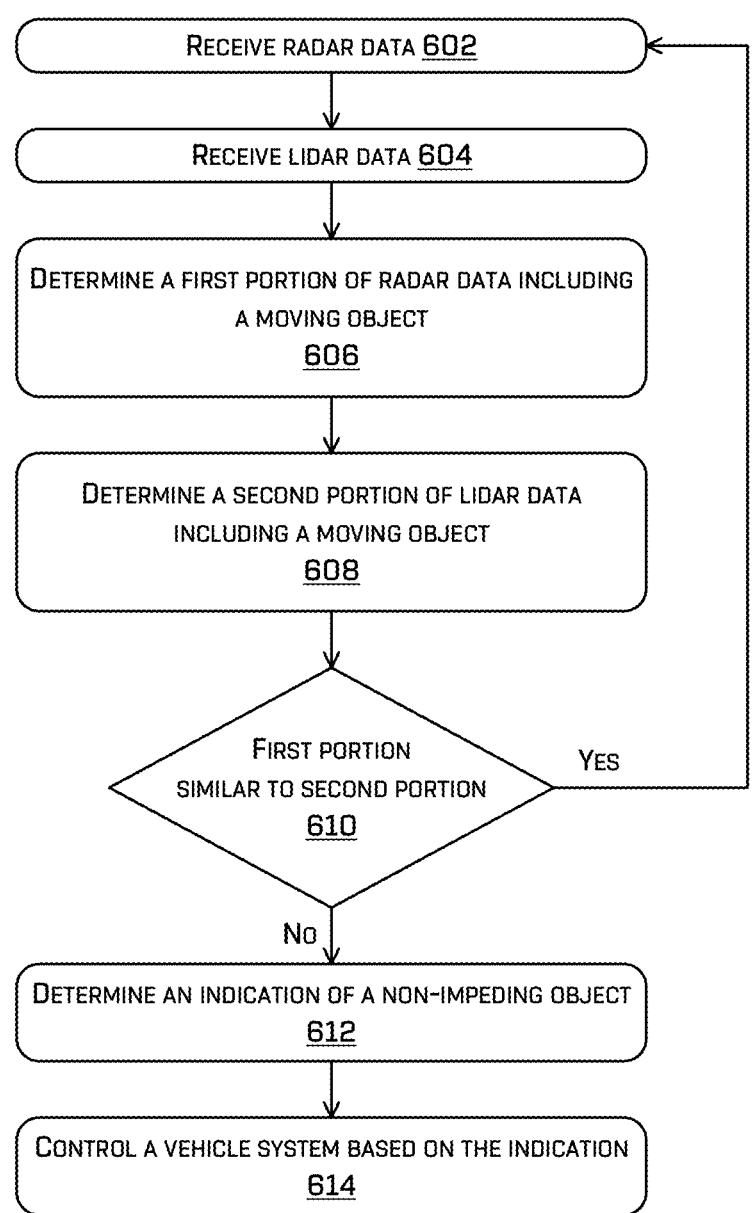

FIG. 6 illustrates an example process in accordance with examples of the disclosure. The process is illustrated as a logical flow graph, each operation of which representing a sequence of operations that may be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be omitted and/or combined in any order and/or in parallel to implement the processes.

FIG. 6 illustrates an example flow diagram for a process 600 for non-impeding object detection, according to at least one example. The process 600 may be performed by a computing device, such as a computing device associated with an autonomous vehicle system and may be used to carry out some or all of process 600. In some examples, the process 600 may be performed continuously, to detect non-impeding objects during operation. In some examples, sensor data or other inputs, such as weather report data, may be used to identify conditions that may lead to the presence of non-impeding object, and the process 600 may be triggered by the recognition of such data and/or events. The other inputs may include indicia that lidar and/or vision systems of a vehicle system are impaired by a non-impeding object.

At 602, the process 600 includes receiving radar data. The radar data is received from one or more radar devices associated with a vehicle system or other system. The radar data may include returns from one or more radar channels.

At 604, the process 600 includes receiving lidar data. The lidar data is received from one or more lidar devices associated with a vehicles system or other system. The lidar data may include returns from one or more radar channels.

At 606, the process 600 includes determining a first portion of the radar data including a moving object. The first portion may be determined based on the doppler velocity of the object and/or based on a subtraction of consecutive frames or radar data to remove stationary objects from the radar data.

At 608, the process 600 includes determining a second portion of lidar data including the moving object. The second portion may be determined based on a subtraction of consecutive frames or radar data to remove stationary objects from the lidar data.

At 610, the process 600 includes determining a similarity between the first portion and the second portion. The similarity may be determined as described herein and may be based on a correlation of the radar data and the lidar data (after the stationary objects are removed). The similarity may be used to determine whether a non-impeding object is present in the operating environment. For example, when the similarity is low, e.g., when there is low correlation, then the first portion and second portion are not similar and the process 600 proceeds to 612. When similarity is high, meaning high correlation, then the lidar and radar returns may be used as normal and the process 600 continues.

At 612, the process 600 includes determining an indication of a non-impeding object. The indication of the non-impeding object includes an identification of the non-impeding object as present as well as a determination of the density of the non-impeding object, as described herein. The indication of the non-impeding object may include an indication of a low correlation and/or similarity and may also include the density score associated therewith.

At 614, the process 600 includes controlling a vehicle system based on the indication of the non-impeding object. After determining the similarity score and/or the indication and/or density of the non-impeding object as described above, the autonomous vehicle may navigate through the environment using the radar and lidar returns in a modified manner and/or may control operation of the vehicle based on the non-impeding object. For example, the lidar data may be assigned a confidence score based on the density of the non-impeding object and/or a distance of the lidar return, with higher density and greater distances associated with lower confidence scores. The confidence score may be used by a planning component of the autonomous vehicle to weight and/or partially or totally ignore lidar returns in the presence of the non-impeding object. In some examples the lidar data may be weighted according to the confidence score, and receive a lower weighting when the confidence score associated with the lidar returns is low. In some examples, controlling the vehicle may include removing the portion of the lidar data corresponding to the non-impeding object and controlling the vehicle based on the remaining lidar returns.

In some examples, controlling a vehicle can include modifying operation of the vehicle's perception or other models. For example, an autonomous vehicle may reduce the range in which it relies on lidar or other sensor systems that may be degraded due to detected non-impeding objects. Lidar and vision modalities may be primary modalities used for operation of an autonomous vehicle due to their resolution and ranging capabilities. As disclosed herein, an effective range of such modalities may be determined and modified accordingly. In some examples, the range may be non-uniform around a vehicle to account for localized obstructions as disclosed herein. Further mitigation strategies may include using a different model fur interpreting returns from sensors (e.g., one that may be tuned to operate better in foggy or similar conditions). In additional to or in conjunction with using a different model for a certain modality, a vehicle may modify confidence levels associated with inputs from certain modalities to rely more on inputs from modalities (e.g., radar) that are less impacted by the detected non-impeding object(s). The vehicle may also be constrained to operate with reduce speed or operate in a more cautious manner when sensor performance may be degraded.

Figure 7:
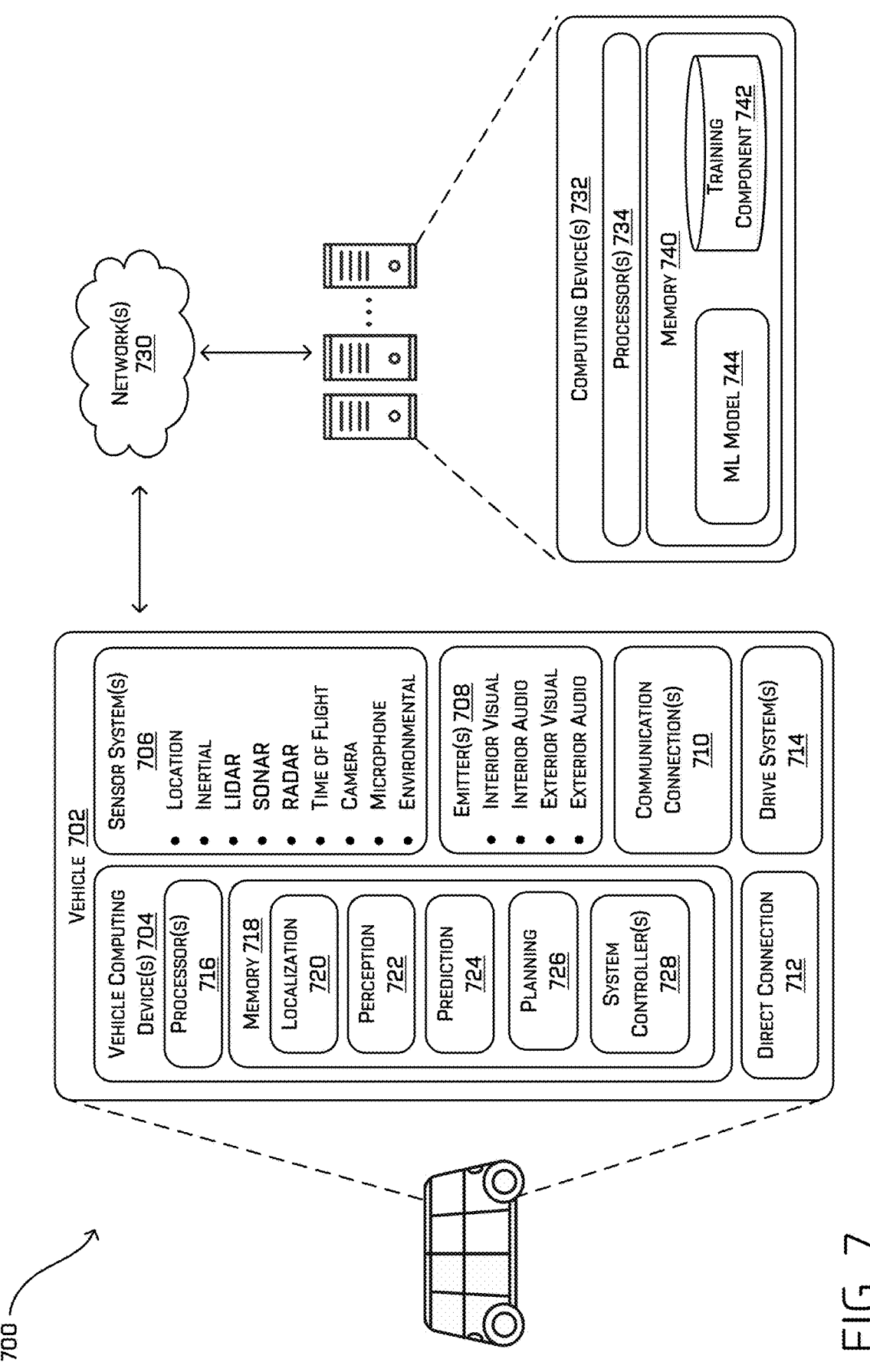
FIG. 7 illustrates an example block diagram of a system illustrating elements that may enable detection of non-impeding objects, according to at least one example.

FIG. 7 is a block diagram illustrating an example system 700 for procedurally generating a simulated environment. In at least one example, a vehicle 702 can include one or more vehicle computing device(s) 704, one or more sensor system(s) 706, one or more emitters 708, one or more communication connections 710, at least one direct connection 712, and one or more drive systems 714. For the purpose of illustration, the vehicle 702 can be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In such an example, since the vehicle 702 can be configured to control all functions from start to stop, including all parking functions, it can be unoccupied. This is merely an example, and the systems and methods described herein can be incorporated into any ground-borne, airborne, or waterborne vehicle, including those ranging from vehicles that need to be manually controlled by a driver at all times, to those that are partially or fully autonomously controlled. That is, in the illustrated example, the vehicle 702 is an autonomous vehicle; however, the vehicle 702 could be any other type of vehicle.

In at least one example, the vehicle 702 can be a data collection device. In an additional or alternative example, the one or more components of the AI stack described above can be associated with the vehicle 702. That is, the simulated environment described herein can be used to train, test, and/or validate one or more of the components described below with reference to vehicle 702.

The vehicle computing device(s) 704 can include processor(s) 716 and memory 718 communicatively coupled with the processor(s) 716. In the illustrated example, the memory 718 of the vehicle computing device(s) 704 stores a localization system 720, a perception system 722, a prediction system 724, a planning system 726, and one or more system controllers 728. Additionally, the memory 718 can include a storage (not shown), which can store map(s), model(s), etc. A map can be any number of data structures modeled in two dimensions, three dimensions, or N dimensions that are capable of providing information about an environment, such as, but not limited to, topologies (such as intersections), streets, mountain ranges, roads, terrain, and the environment in general. Maps can be associated with real environments or simulated environments. Model(s) can include machine-trained models, as described below.

In at least one example, the localization system 720 can determine a pose (e.g., a position and an orientation) of the vehicle 702 in relation to a local and/or global map based at least in part on sensor data received from the sensor system(s) 706 and/or map data associated with a map (e.g., of the map(s)). In at least one example, the localization system 720 can include, or be associated with a calibration system that is capable of performing operations for calibrating (determining various intrinsic and extrinsic parameters associated with any one or more of the sensor system(s) 706), localizing, and mapping substantially simultaneously. Additional details associated with such a system are described in U.S. patent application Ser. No. 15/675,487, filed on Aug. 11, 2017, which is related to U.S. patent application Ser. No. 15/674,853, filed on Aug. 11, 2017, the entire contents of both of which are incorporated by reference herein. As described above, the localization system 720 can output road network data and/or a road mesh based on the sensor data received by the sensor system(s) 706.

In at least one example, the perception system 722 can perform object detection, segmentation, and/or classification based at least in part on sensor data received from the sensor system(s) 706. In at least one example, the perception system 722 can receive raw sensor data (e.g., from the sensor system(s) 706). In other examples, the perception system 722 can receive processed sensor data (e.g., from the sensor system(s) 706). For instance, in at least one example, the perception system 722 can receive data from a vision system that receives and processes camera data (e.g., images). In at least one example, the vision system can utilize one or more image processing algorithms to perform object detection, segmentation, and/or classification with respect to object(s) identified in an image. In some examples, the vision system can associate a bounding box (or other semantic information, such as an instance segmentation) with an identified object and can associate a confidence score associated with a classification of the identified object. In some examples, objects, when rendered via a display, can be colored based on their perceived class. In at least other examples, similar processes (detection, classification, segmentation, etc.) may be performed by the perception system 722 for one or more other modalities (e.g., lidar, RADAR, ToF sensors, etc.).

The prediction system 724 can access sensor data from the sensor system(s) 706, map data associated with a map (e.g., of the map(s) which can be in the storage), and/or perception data output from the perception system 722 (e.g., processed sensor data), and can output predictions associated with one or more objects within the environment of the vehicle 702. In at least one example, the planning system 726 can determine routes and/or trajectories to use to control the vehicle 702 based at least in part on sensor data received from the sensor system(s) 706 and/or any determinations made by the perception system 722. Additional details of localizer systems, perception systems, prediction systems, and/or planning systems that are usable can be found in U.S. Pat. No. 9,612,123, issued on Apr. 4, 2017, and U.S. patent application Ser. No. 15/632,208, filed Jun. 23, 2017, the entire contents of both of which are incorporated by reference herein. In some examples (e.g., where the vehicle 702 is not an autonomous vehicle), one or more of the aforementioned systems and/or components can be omitted from the vehicle 702. While the systems described above are illustrated as "onboard" the vehicle 702, in other implementations, the systems can be remotely located and/or accessible to the vehicle 702.

In at least one example, the localization system 720, the perception system 722, the prediction system 724, and/or the planning system 726 can process sensor data, as described above, and can send their respective outputs over network(s) 730, to computing device(s) 732. In at least one example, the localization system 720, the perception system 722, the prediction system 724, and/or the planning system 726 can send their respective outputs to the computing device(s) 732 at a particular frequency, after a lapse of a predetermined period of time, in near real-time, etc.

In at least one example, the vehicle computing device(s) 704 can include one or more system controllers 728, which can be configured to control steering, propulsion, braking, safety, emitters, communication, and other systems of the vehicle 702. These system controller(s) 728 can communicate with and/or control corresponding systems of the drive system(s) 714 and/or other components of the vehicle 702.

In at least one example, the sensor system(s) 706, can include lidar sensors, radar sensors, ToF sensors, ultrasonic transducers, SONAR sensors, location sensors (e.g., GPS, compass, etc.), inertial sensors (e.g., inertial measurement units, accelerometers, magnetometers, gyroscopes, etc.), cameras (e.g., RGB, IR, intensity, depth, etc.), microphones, wheel encoders, environment sensors (e.g., temperature sensors, humidity sensors, light sensors, pressure sensors, etc.), etc. The sensor system(s) 706 can include multiple instances of each of these or other types of sensors. For instance, the lidar sensors can include individual lidar sensors located at the corners, front, back, sides, and/or top of the vehicle 702. As another example, the camera sensors can include multiple cameras disposed at various locations about the exterior and/or interior of the vehicle 702. The sensor system(s) 706 can provide input to the vehicle computing device(s) 704. In some examples, the sensor system(s) 706 can preprocess at least some of the sensor data prior to sending the sensor data to the vehicle computing device(s) 704. In at least one example, the sensor system(s) 706 can send sensor data, via the network(s) 730, to the computing device(s) 732 at a particular frequency, after a lapse of a predetermined period of time, in near real-time, etc.

The vehicle 702 can also include one or more emitters 708 for emitting light and/or sound, as described above. The emitter(s) 708 in this example include interior audio and visual emitters to communicate with passengers of the vehicle 702. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 708 in this example also include exterior emitters. By way of example and not limitation, the exterior emitters in this example include light emitters (e.g., indicator lights, signs, light arrays, etc.) to visually communicate with pedestrians, other drivers, other nearby vehicles, etc., one or more audio emitters (e.g., speakers, speaker arrays, horns, etc.) to audibly communicate with pedestrians, other drivers, other nearby vehicles, etc., etc. In at least one example, the emitter(s) 708 can be disposed at various locations about the exterior and/or interior of the vehicle 702.

The vehicle 702 can also include communication connection(s) 710 that enable communication between the vehicle 702 and other local or remote computing device(s). For instance, the communication connection(s) 710 can facilitate communication with other local computing device(s) on the vehicle 702 and/or the drive system(s) 714. Also, the communication connection(s) 710 can allow the vehicle to communicate with other nearby computing device(s) (e.g., other nearby vehicles, traffic signals, etc.). The communications connection(s) 710 also enable the vehicle 702 to communicate with a remote teleoperations computing device or other remote services.

The communications connection(s) 710 can include physical and/or logical interfaces for connecting the vehicle computing device(s) 704 to another computing device or a network, such as network(s) 730. For example, the communications connection(s) 710 can enable Wi-Fi-based communication such as via frequencies defined by the IEEE 802.11 standards, short range wireless frequencies such as BLUETOOTH®, or any suitable wired or wireless communication protocol that enables the respective computing device to interface with the other computing device(s).

The direct connection 712 can directly connect the drive system(s) 714 and other components of the vehicle 702.

In at least one example, the vehicle 702 can include drive system(s) 714. In some examples, the vehicle 702 can have a single drive system 714. In at least one example, if the vehicle 702 has multiple drive systems 714, individual drive systems 714 can be positioned on opposite ends of the vehicle 702 (e.g., the front and the rear, etc.). In at least one example, the drive system(s) 714 can include sensor system(s) to detect conditions of the drive system(s) 714 and/or the surroundings of the vehicle 702. By way of example and not limitation, the sensor system(s) can include wheel encoder(s) (e.g., rotary encoders) to sense rotation of the wheels of the drive module, inertial sensors (e.g., inertial measurement units, accelerometers, gyroscopes, magnetometers, etc.) to measure position and acceleration of the drive module, cameras or other image sensors, ultrasonic sensors to acoustically detect objects in the surroundings of the drive module, lidar sensors, radar sensors, etc. Some sensors, such as the wheel encoder(s), can be unique to the drive system(s) 714. In some cases, the sensor system(s) on the drive system(s) 714 can overlap or supplement corresponding systems of the vehicle 702 (e.g., sensor system(s) 706).

The drive system(s) 714 can include many of the vehicle systems, including a high voltage battery, a motor to propel the vehicle 702, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 714 can include a drive module controller which can receive and preprocess data from the sensor system(s) and to control operation of the various vehicle systems. In some examples, the drive module controller can include processor(s) and memory communicatively coupled with the processor(s). The memory can store one or more modules to perform various functionalities of the drive system(s) 714. Furthermore, the drive system(s) 714 also include communication connection(s) that enable communication by the respective drive module with other local or remote computing device(s).

In some examples, the vehicle computing device(s) 704, sensor system(s) 706, emitter(s) 708, and the communication connection(s) 710 can be implemented outside of an actual vehicle, for instance, as a simulated vehicle or as simulated systems, for use in "traversing" a simulated environment. That is, the vehicle computing device(s) 704, sensor system(s) 706, emitter(s) 708, and the communication connection(s) 710 can be used as a simulated autonomous vehicle for simulation purposes as described above.

As described above, the vehicle 702 can send sensor data to the computing device(s) 732, via the network(s) 730. In some examples, the vehicle 702 can send raw sensor data to the computing device(s) 732. In other examples, the vehicle 702 can send processed sensor data and/or representations of sensor data to the computing device(s) 732 (e.g., data output from the localization system 720, the perception system 722, the prediction system 724, and/or the planning system 726). In some examples, the vehicle 702 can send sensor data to the computing device(s) 732 at a particular frequency, after a lapse of a predetermined period of time, in near real-time, etc.

The computing device(s) 732 can receive the sensor data (raw or processed) from the vehicle 702 and/or one or more data collection devices 736 (which can include other vehicles like vehicle 702), as well as data from one or more third-party sources and/or systems 738. In at least one example, the computing device(s) 732 can include processor(s) 734 and memory 740 communicatively coupled with the processor(s) 734. In the illustrated example, the memory 740 of the computing device(s) 732 stores a machine learning model 744 and a training component 742 that may be used to determine the similarity score between the radar and lidar returns and also may be used for determining the density of the non-impeding object as described herein. In some examples, one or more of the systems and/or storage repositories can be associated with the vehicle 702 instead of, or in addition to, being associated with the memory 740 of the computing device(s) 732.

As described above, simulated environments can be useful for enhancing training, testing, and/or validating systems (e.g., one or more components of an AI stack) onboard an autonomous vehicle, such as vehicle 702. In at least one example, simulated environments can be useful for training data models where training data from real environments is insufficient (e.g., as is the case with rare objects, rare scenarios, etc.). In such examples, a resulting data model can be provisioned to, or accessible by, the vehicle 702, and the vehicle 702 can utilize the data model for classifying objects in real-time (e.g., while driving or otherwise operating in the real environment). That is, the perception system 722 can utilize the data model (trained based on simulated data associated with a simulated environment) onboard in near real-time to classify objects.

As a non-limiting example, training data from real environments is insufficient for training the vehicle 702 to recognize rare events/objects (e.g., traffic lights types that are not frequently seen). In at least one example, by comparing simulated environments with real environments, the data model can learn that particular parameters matter for training a traffic light classifier. For instance, such parameters can include bulb discoloration, shading, lens distortion, dirt on the light, a burnt-out filament, variation in brightness, bulb rotation, bulb intensity, etc. Based on identifying the parameters, the training system 346 can tune simulated environments associated with traffic lights and can train a traffic light classifier based on the tuned simulated environments. Such a classifier can be provisioned to, or accessible by, the vehicle 702, and the vehicle 702 can utilize the data model for classifying traffic lights in real-time. For instance, the perception system 722 can utilize the classifier (trained based on simulated data used to generate a simulated environment) onboard in near real-time to classify traffic lights. That is, as described above, in at least one example, a classifier can be trained on simulated data and used for evaluating real data. In some examples, the classifier can be trained on real data and validated using simulated data. In such examples, identified discrepancies can be used to improve the classifier. In at least some instances, such rare examples may be identified by training, for example, a traffic light detector based on simulated image data, running the detector on real data, and determining where detections were missed. Similarly, determining that simulated parameters are not correct may comprise training an algorithm (e.g., the same detector as above) on real data, running such a detector on simulated data, and detecting missed objects.

Furthermore, simulated environments can be useful for validating and/or updating a localization algorithm used by the localization system 720. For instance, in real environments, GPS sensors experience positional drifts and may, as a result, accumulate error. Accordingly, to validate a localization algorithm that is used for localizing the vehicle 702, the evaluating computing device(s) 732 can use a simulated environment, where the pose of the vehicle 702 is known at various times (including at all times) and evaluate the sensor data associated with a corresponding real environment to validate the localization algorithm (e.g., by relying on simulated poses as position and/or orientation ground truth). In such an example, the sensor system(s) 706 can generate sensor data associated with the simulated environment and the sensor data can be analyzed by the perception system 722. An output of the perception system 722 (e.g., associated with a position in a real environment) can be validated in view of the sensor data associated with the corresponding position in the simulated environment. That is, the sensor data associated with a position in a simulated environment can serve as the ground truth for the corresponding position in the real environment. As an example, lidar data recorded in association with a simulated environment (e.g., where the pose of the vehicle 702 is known) can be compared to lidar data recorded in association with a corresponding position in a real environment and the localization algorithm can be updated as appropriate. Furthermore, simulated environments can be useful for validating radar or other sensors of the sensor system(s) 706. In some examples, simulated environments can offer ground truth data for calibrating sensors (e.g., of the sensor system(s) 706). Other examples include but are not limited to validating rolling shutter in simulation, calibration (e.g., of one or more of intrinsics or extrinsics) of various sensors, and the like. As would be appreciated, the techniques described herein may be used in validation, calibration, training, etc. for various other systems, subsystems, etc.

The processor(s) 716 of the vehicle 702 and the processor(s) 734 of the computing device(s) 732 can be any suitable processor capable of executing instructions to process data and perform operations as described herein. By way of example and not limitation, the processor(s) 716 and 734 can comprise one or more Central Processing Units (CPUs), Graphics Processing Units (GPUs), or any other device or portion of a device that processes electronic data to transform that electronic data into other electronic data that can be stored in registers and/or memory. In some examples, associated circuits (e.g., ASICs, etc.), gate arrays (e.g., FPGAs, etc.), and other hardware devices can also be considered processors in so far as they are configured to implement encoded instructions.

Memory 718 and 740 are examples of non-transitory computer-readable media. Memory 718 and 740 can store an operating system and one or more software applications, instructions, programs, and/or data to implement the methods described herein and the functions attributed to the various systems. In various implementations, the memory can be implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

It should be noted that while FIG. 7 is illustrated as a distributed system, in alternative examples, components of the vehicle 702 can be associated with the computing device(s) 732 and/or components of the computing device(s) 732 can be associated with the vehicle 702. That is, the vehicle 702 can perform one or more of the functions associated with the computing device(s) 732, and vice versa.

EXAMPLE CLAUSES

A: A vehicle system, comprising: a sensor array comprising: a radar sensor; and a lidar sensor; at least one processor; and computer-readable instructions that, when executed by the at least one processor, cause the at least one processor to perform acts comprising: receiving radar data from the radar sensor; receiving lidar data from the lidar sensor; determining a first portion of the radar data is associated with a moving object; determining a second portion of the lidar data is associated with the moving object; determining a similarity score between the first portion and the second portion using a similarity algorithm, wherein the similarity score indicates the presence of a non-impeding object in an environment of the vehicle system; determining, based at least in part on the similarity score, an effective range for the lidar sensor for the environment; and controlling the vehicle system based at least in part on the effective range.

B: The vehicle system of example A, wherein determining the second portion of the lidar data comprises: receiving first lidar data comprising first point cloud data at a first time and second lidar data comprising second point cloud data at a second time; determining static objects represented in the first point cloud data and the second point cloud data that are stationary between the first point cloud data and the second point cloud data; and determining the moving object by removing the static objects.

C: The vehicle system of any of examples A-B, wherein the similarity algorithm comprises at least one of: a cosine similarity score; a Jaccard similarity index; a Johnson-Lindenstrauss transform; or a Euclidean similarity.

D: The vehicle system of any of examples A-C, wherein determining the effective range comprises: determining an indication of a non-impeding object at a first location based on the similarity score; determining a first effective range in a first direction from the lidar sensor to the first location based on the indication of the non-impeding object; and determining a second effective range in a second direction from the lidar sensor to a second location.

E: The vehicle system of any of examples A-D, wherein the controlling the vehicle system comprises modifying a perception system of the vehicle system to reduce reliance on or ignore lidar returns beyond the effective range in the environment.

F: The vehicle system of any of examples A-E, wherein determining the effective range for the lidar sensor comprises: determining a density of a non-impeding object based at least in part on the similarity score; and determining the effective range for the lidar sensor based on the density of the non-impeding object.

G: A method comprising: determining radar indicia from a radar sensor, the radar indicia corresponding to an object in an environment; determining lidar indicia from a lidar sensor corresponding to the object in the environment; determining a similarity score between the radar indicia and the lidar indicia; determining, based at least in part on the similarity score, an effective range for the lidar sensor within the environment; and controlling a vehicle system based at least in part on the effective range for operation in the environment using the lidar sensor.

H: The method of example G, wherein determining the similarity score and determining the effective range comprises inputting the radar data and the lidar data into a machine learning model trained using training radar data, training lidar data, and effective range data.

I: The method of any of examples G-H, wherein controlling the vehicle system comprises ignoring a subset of the lidar indicia based on the effective range.

J: The method of any of examples G-I, wherein determining the lidar indicia corresponding to the object comprises: receiving first lidar data comprising first indicia data at a first time and second lidar data comprising second indicia data at a second time; determining static objects represented in the first indicia data and the second point cloud data that are stationary between the first indicia data and the second indicia data; and determining the moving object by removing the static objects.

K: The method of any of examples G-J, wherein determining the similarity score comprises: receiving aggregated radar data over a period of time; receiving aggregated lidar data over the period of time; and determining the similarity score based on the aggregated radar data and the aggregated lidar data.

L: The method of any of examples G-K, further comprising: determining a confidence score for the lidar data based on the effective range, and wherein controlling the vehicle system is based on the confidence score.

M: The method of any of examples G-L, wherein determining the confidence score comprises: determining a first confidence score for a first distance less than the effective range; and determining a second confidence score for a second distance greater than the effective range, the first confidence score greater than the second confidence score.

N: The method of any of examples G-M, wherein controlling the vehicle system based at least in part on the effective range comprises adjusting a reliance of the vehicle system on the lidar sensor based on the effective range.

O: A vehicle system comprising: at least one processor; and computer-readable instructions that, when executed by the at least one processor, cause the at least one processor to perform acts comprising: determining radar indicia from a radar sensor, the radar indicia corresponding to an object in an environment; determining a lidar indicia from a lidar sensor corresponding to the object in the environment; determining a similarity score between the radar indicia and the lidar indicia; determining, based at least in part on the similarity score, an effective range for the lidar sensor within the environment; and controlling the vehicle system based at least in part on the effective range for operation in the environment using the lidar sensor.

P: The vehicle system of example O, wherein controlling the vehicle system comprises ignoring a subset of the lidar indicia based on the effective range.

Q: The vehicle system of any of examples O-P, wherein determining the lidar indicia corresponding to the object comprises: receiving first lidar data comprising first indicia data at a first time and second lidar data comprising second indicia data at a second time; determining static objects represented in the first indicia data and the second point cloud data that are stationary between the first indicia data and the second indicia data; and determining the moving object by removing the static objects.

R: The vehicle system of any of examples O-Q, wherein determining the similarity score comprises: receiving aggregated radar data over a period of time; receiving aggregated lidar data over the period of time; and determining the similarity score based on the aggregated radar data and the aggregated lidar data.

S: The vehicle system of any of examples O-R, wherein the computer-readable instructions cause the at least one processor to perform additional acts comprising: determining a confidence score for the lidar data based on the effective range, and wherein controlling the vehicle system is based on the confidence score.

T: The vehicle system of any of examples O-S, wherein determining the confidence score comprises: determining a first confidence score for a first distance less than the effective range; and determining a second confidence score for a second distance greater than the effective range, the first confidence score greater than the second confidence score.

While the example clauses described above are described with respect to one particular implementation, it should be understood that, in the context of this document, the content of the example clauses can also be implemented via a method, device, system, computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations, and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
one or more processors; and
one or more non-transitory computer-readable media storing computer-executable instructions that, when executed, cause the system to perform operations comprising:

receiving radar data of an environment;

receiving lidar data of the environment;

determining, based at least in part on comparing the radar data and the lidar data, a presence of a non-impeding object in the environment;

determining, based at least in part on the presence of the non-impeding object, an effective range for a lidar sensor; and controlling a vehicle based at least in part on the effective range.

2. The system of claim 1, wherein controlling the vehicle is further based at least in part on:

determining, based at least in part on the presence of the non-impeding object, a subset of the lidar data associated with the non-impeding object; and controlling the vehicle based at least in part on the subset of the lidar data.

3. The system of claim 1, wherein determining the presence of the non-impeding object is further based at least in part on:

determining a first portion of the radar data that is associated with a moving object;

determining a first portion of the lidar data that is associated with the moving object; and determining a similarity between the first portion of the radar data and the first portion of the lidar data, the similarity indicating the presence of the non-impeding object.

4. The system of claim 3, wherein:

receiving lidar data comprises receiving first lidar data comprising first point cloud data at a first time and second lidar data comprising second point cloud data at a second time; and determining the first portion of the lidar data comprises:

determining static objects represented in the first point cloud data and the second point cloud data that are stationary between the first point cloud data and the second point cloud data; and determining the moving object by removing the static objects.

5. The system of claim 1, wherein determining the effective range comprises:

determining an indication of the non-impeding object at a first location;

determining a first effective range in a first direction from the lidar sensor to the first location based on the indication of the non-impeding object; and determining a second effective range in a second direction from the lidar sensor to a second location.

6. The system of claim 1, wherein determining the presence of the non-impeding object is further based at least in part on a velocity associated with the radar data and a velocity associated with the lidar data.

7. One or more non transitory computer readable media storing instructions executable by one or more processors, wherein the instructions, when executed, cause a system to perform operations comprising:

receiving radar data of an environment;

receiving lidar data of the environment;

determining, based at least in part on comparing the radar data and the lidar data, a presence of a non-impeding object in the environment; and controlling a vehicle based at least in part on removing a portion of the lidar data associated with the non-impeding object.

8. The one or more non transitory computer readable media of claim 7, wherein controlling the vehicle is further based at least in part on:

determining, based at least in part on the presence of the non-impeding object, an effective range for a lidar sensor; and controlling the vehicle based at least in part on the effective range.

9. The one or more non transitory computer readable media of claim 8, wherein determining the effective range comprises:

determining an indication of the non-impeding object at a first location based on a similarity score between the lidar data and the radar data;

determining a first effective range in a first direction from the lidar sensor to the first location based on the indication of the non-impeding object; and determining a second effective range in a second direction from the lidar sensor to a second location.

10. The one or more non transitory computer readable media of claim 8, wherein determining the effective range for the lidar sensor comprises:

determining a density of the non-impeding object based at least in part on a similarity score between the lidar data and the radar data; and determining the effective range for the lidar sensor based on the density of the non-impeding object.

11. The one or more non transitory computer readable media of claim 8, wherein controlling the vehicle comprises modifying a perception system of the vehicle to reduce reliance on or ignore lidar returns beyond the effective range in the environment.

12. The one or more non transitory computer readable media of claim 8, the operations further comprising:

determining a confidence score for the lidar data based on the effective range; and controlling the vehicle is based further on the confidence score.

13. The one or more non transitory computer readable media of claim 7, wherein determining the presence of the non-impeding object is further based at least in part on:

determining a first portion of the radar data that is associated with a moving object;

determining a first portion of the lidar data that is associated with the moving object; and determining a similarity between the first portion of the radar data and the first portion of the lidar data, the similarity indicating the presence of the non-impeding object.

14. The one or more non transitory computer readable media of claim 13, wherein:

receiving lidar data comprises receiving first lidar data comprising first point cloud data at a first time and second lidar data comprising second point cloud data at a second time; and determining the first portion of the lidar data comprises:

determining static objects represented in the first point cloud data and the second point cloud data that are stationary between the first point cloud data and the second point cloud data; and determining the moving object by removing the static objects.

15. The one or more non transitory computer readable media of claim 7, wherein determining the presence of the non-impeding object is further based at least in part on a velocity associated with the radar data and a velocity associated with the lidar data.

16. A method comprising:

receiving radar data of an environment;

receiving lidar data of the environment;

determining, based at least in part on comparing the radar data and the lidar data, a presence of a non-impeding object in the environment;

determining, based at least in part on the presence of the non-impeding object, an effective range for a lidar sensor; and controlling a vehicle based at least in part on the effective range.

17. The method of claim 16, wherein controlling the vehicle is further based at least in part on:

determining, based at least in part on the presence of the non-impeding object, a subset of the lidar data associated with the non-impeding object; and controlling the vehicle based at least in part on the subset of the lidar data.

18. The method of claim 16, wherein determining the presence of the non-impeding object is further based at least in part on:

determining a first portion of the radar data that is associated with a moving object;

determining a first portion of the lidar data that is associated with the moving object; and determining a similarity between the first portion of the radar data and the first portion of the lidar data, the similarity indicating the presence of the non-impeding object.

19. The method of claim 16, wherein determining the effective range comprises:

determining an indication of the non-impeding object at a first location;

determining a first effective range in a first direction from the lidar sensor to the first location based on the indication of the non-impeding object; and determining a second effective range in a second direction from the lidar sensor to a second location.

20. The method of claim 16, wherein determining the presence of the non-impeding object is further based at least in part on a velocity associated with the radar data and a velocity associated with the lidar data.

* * * * *